April 1, 1930. H. B. COLLINS 1,752,784
ENVELOPE FILLING MACHINE
Filed April 30, 1926 14 Sheets-Sheet 1
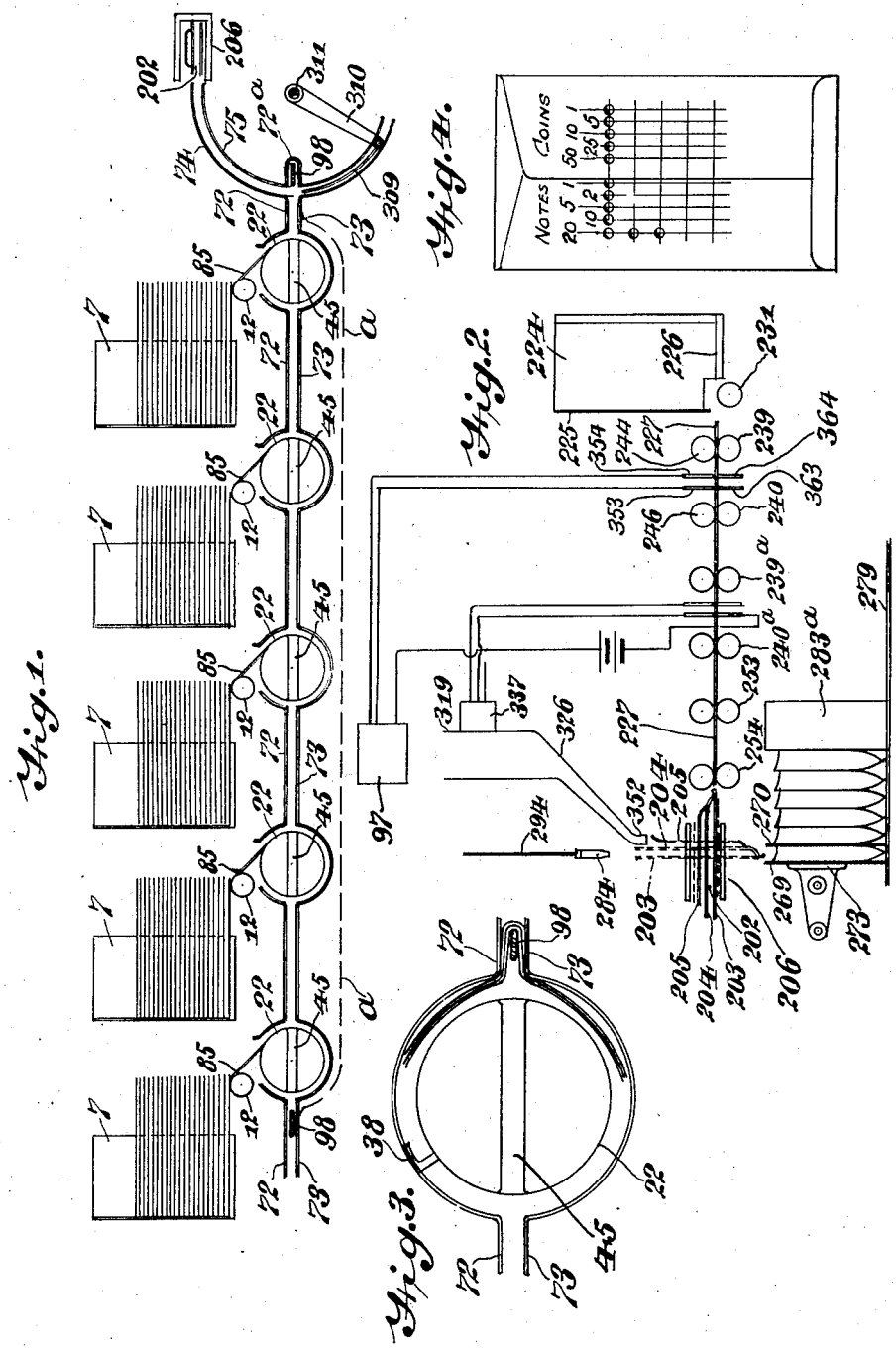
INVENTOR
BY Harold B. Collins
Cyrus N. Anderson
ATTORNEY

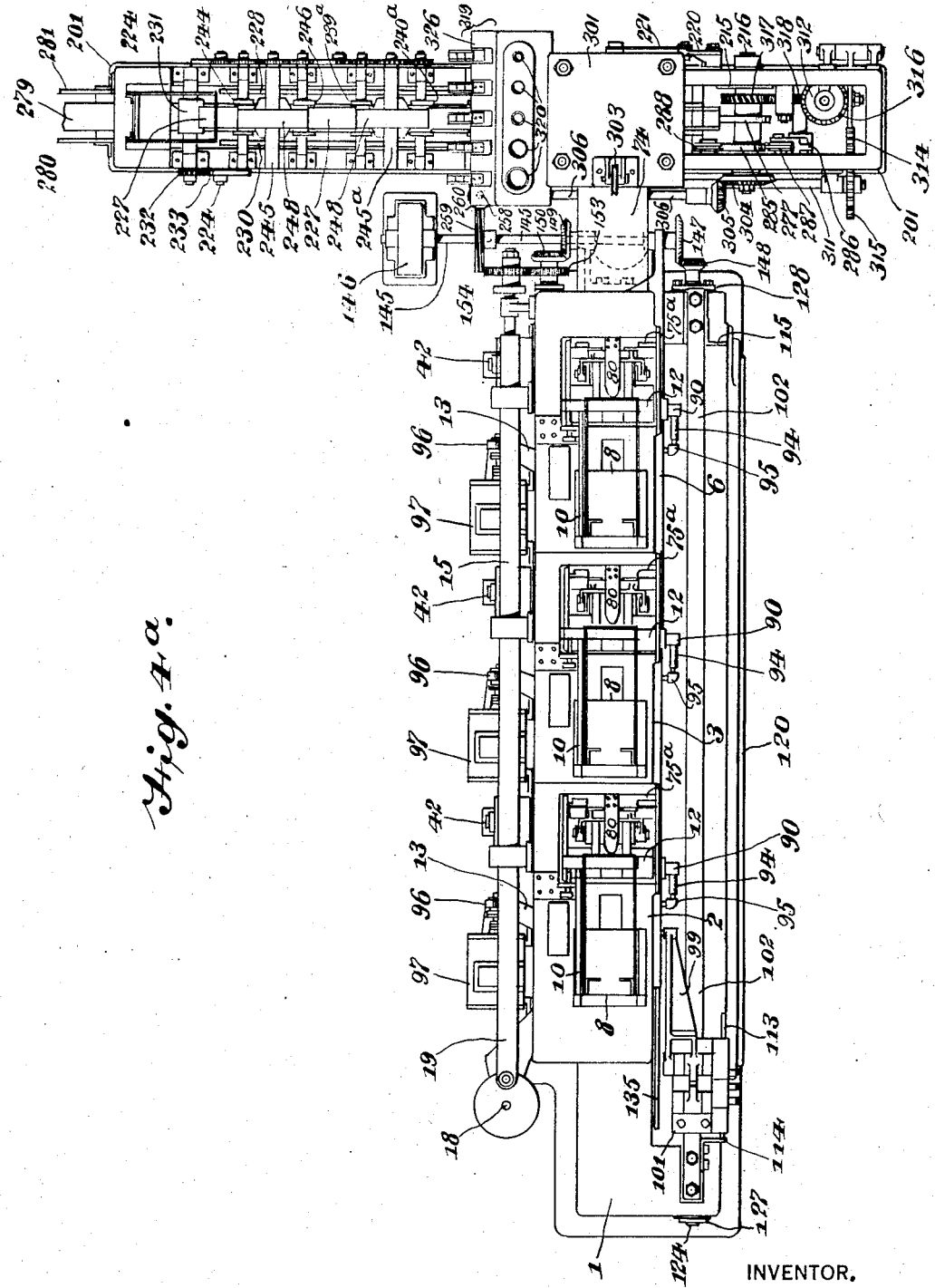

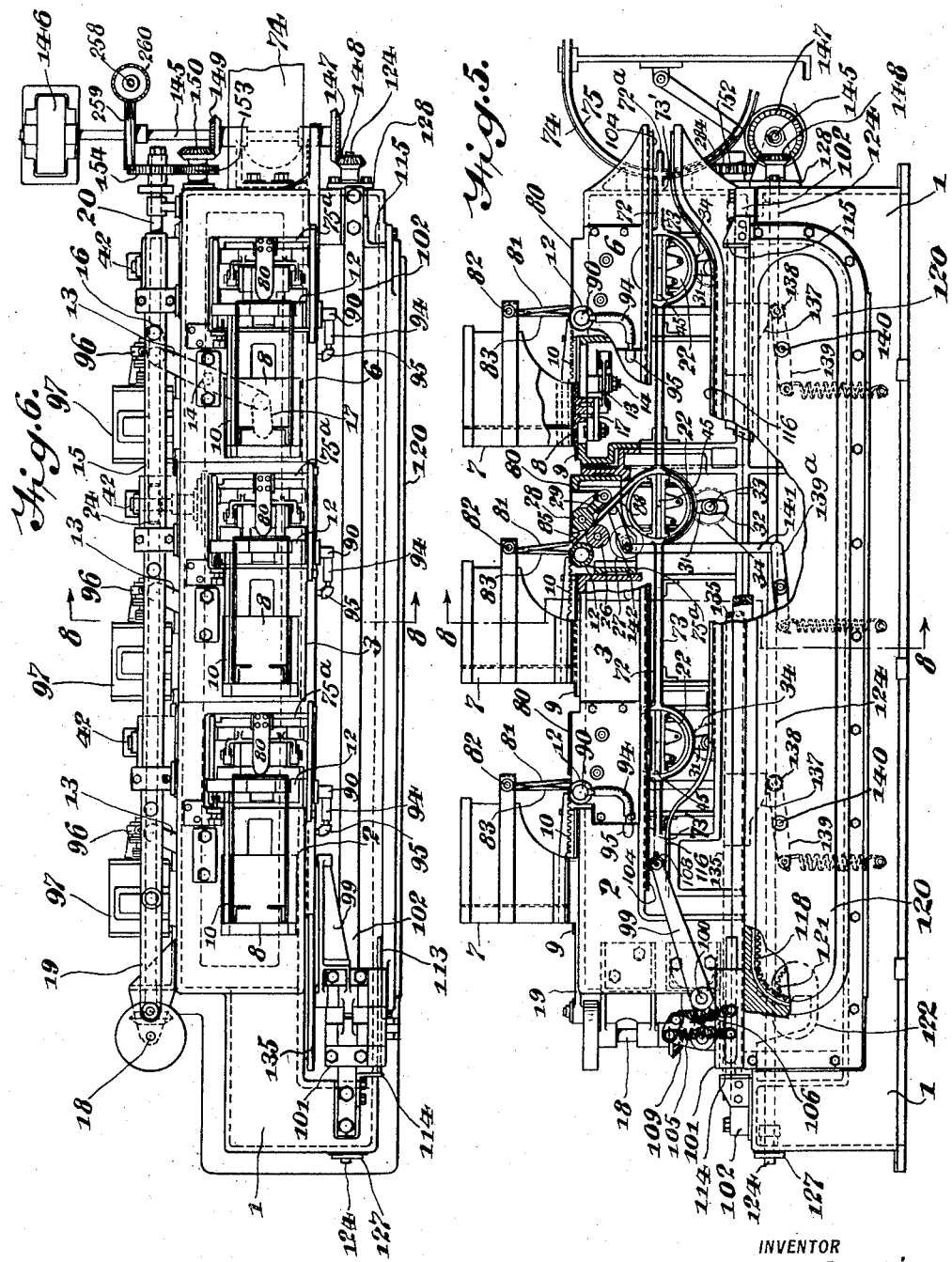

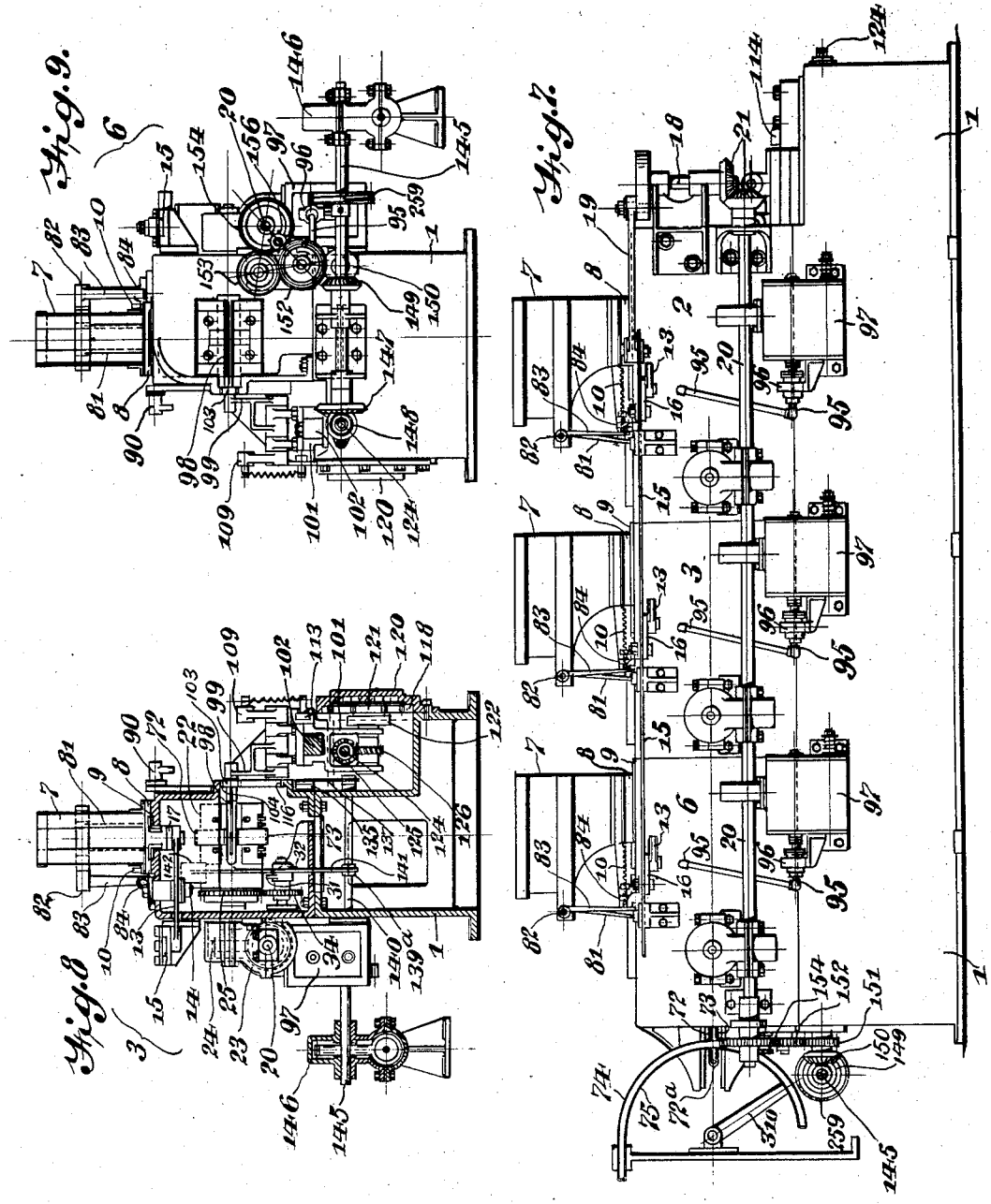

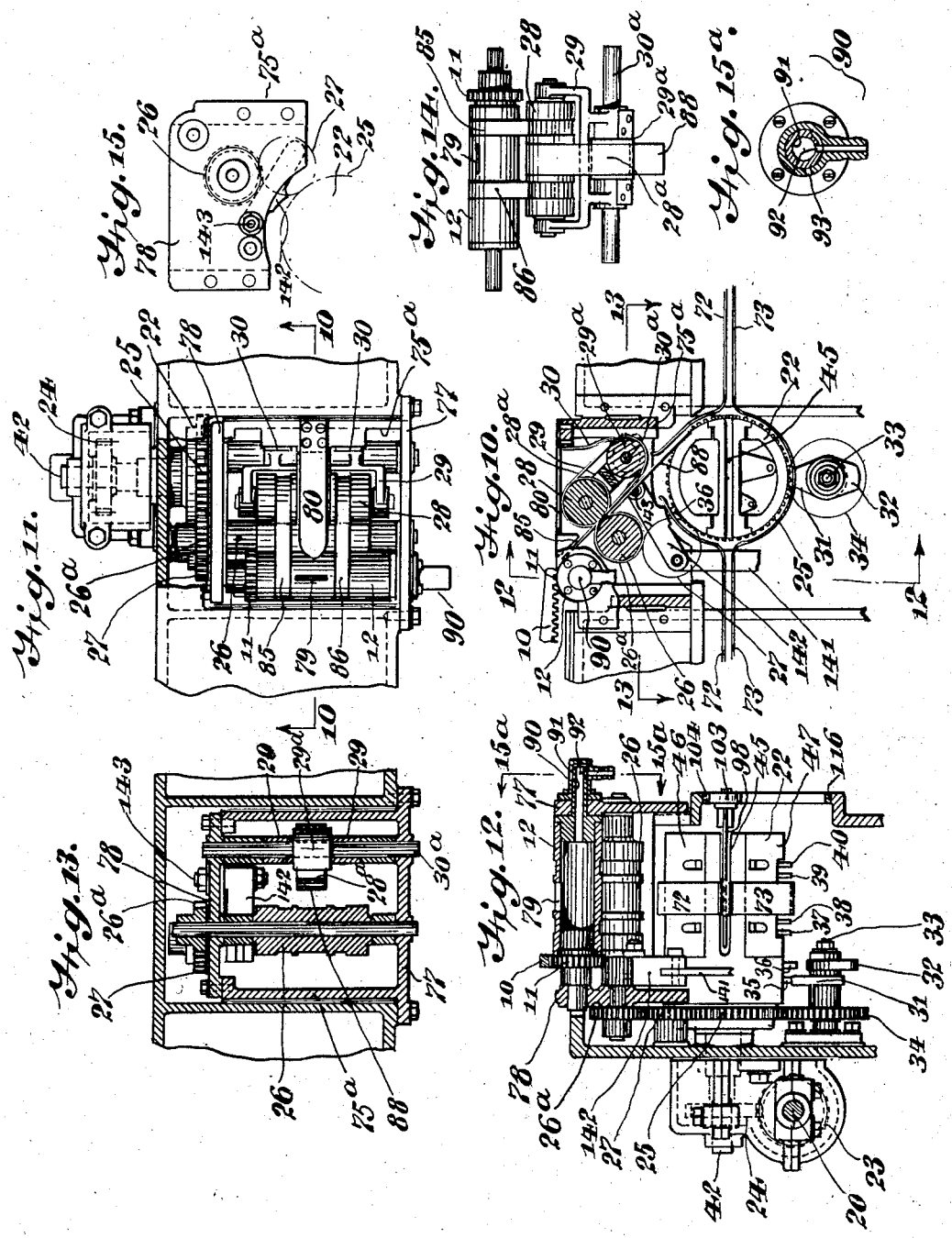

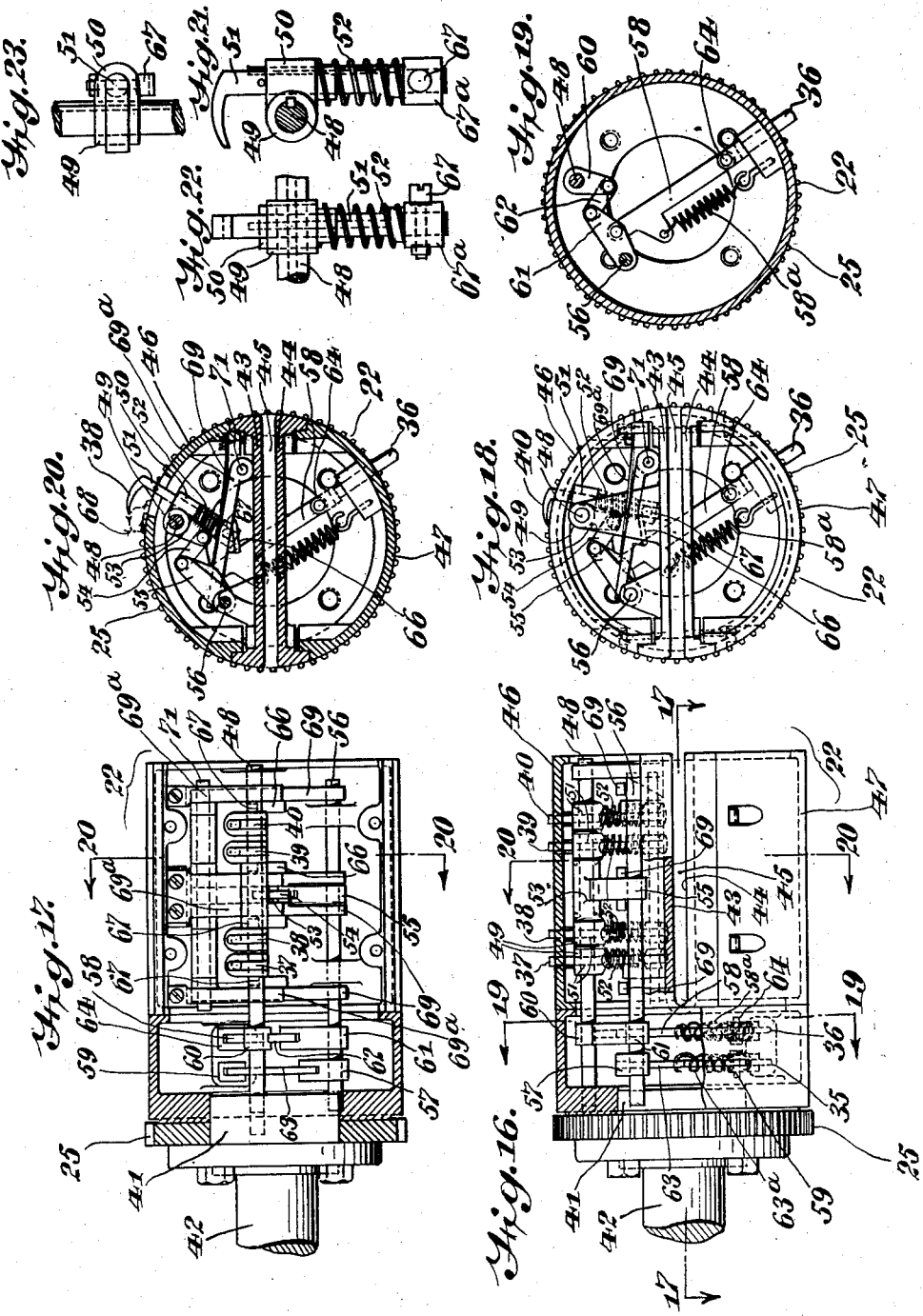

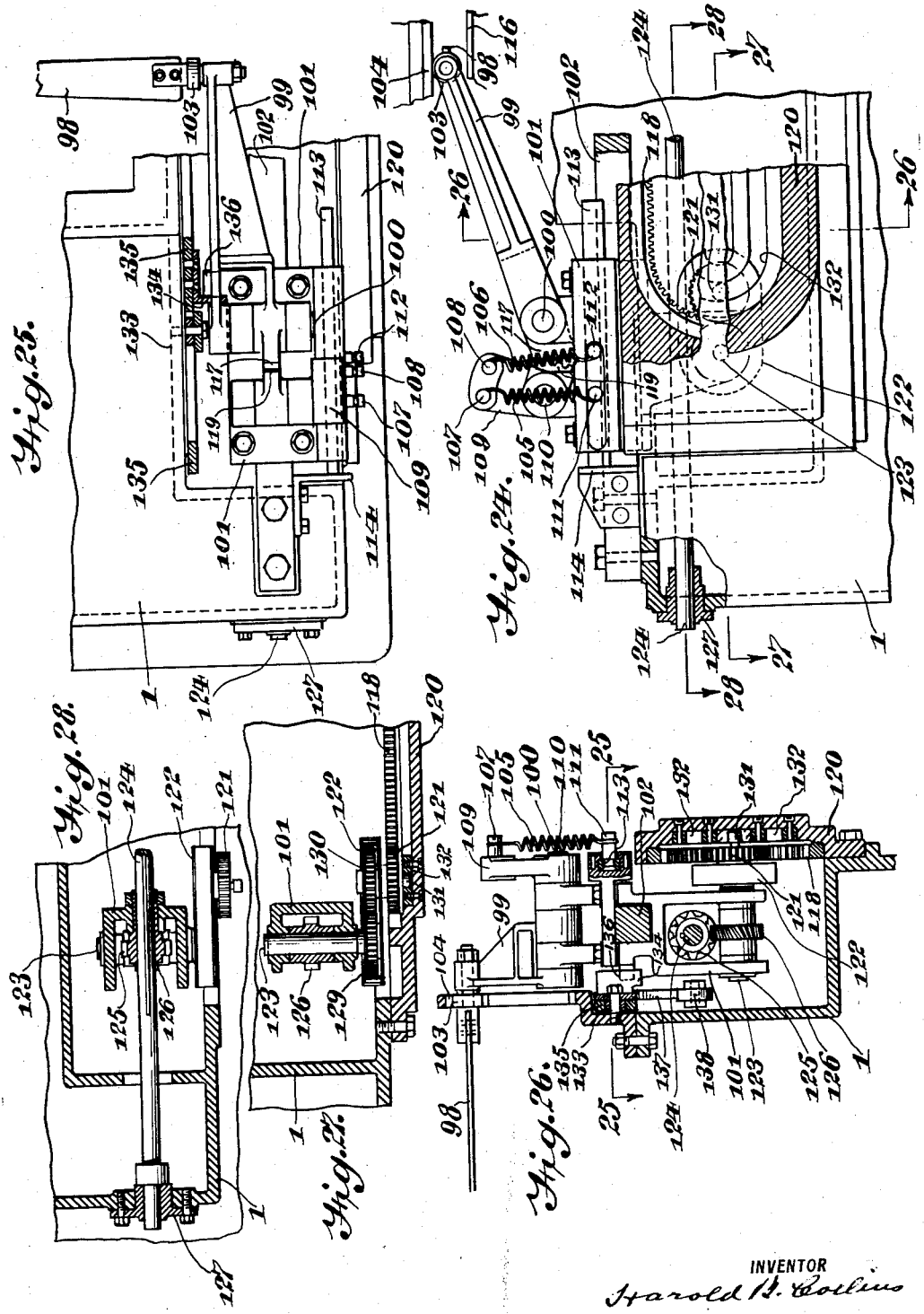

April 1, 1930.                    H. B. COLLINS                    1,752,784
                            ENVELOPE FILLING MACHINE
                      Filed April 30, 1926        14 Sheets-Sheet 8
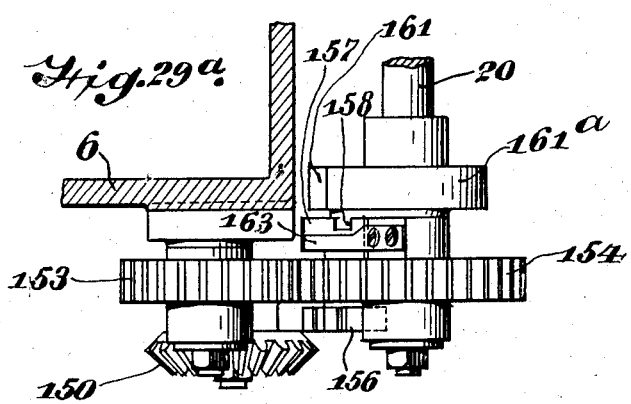
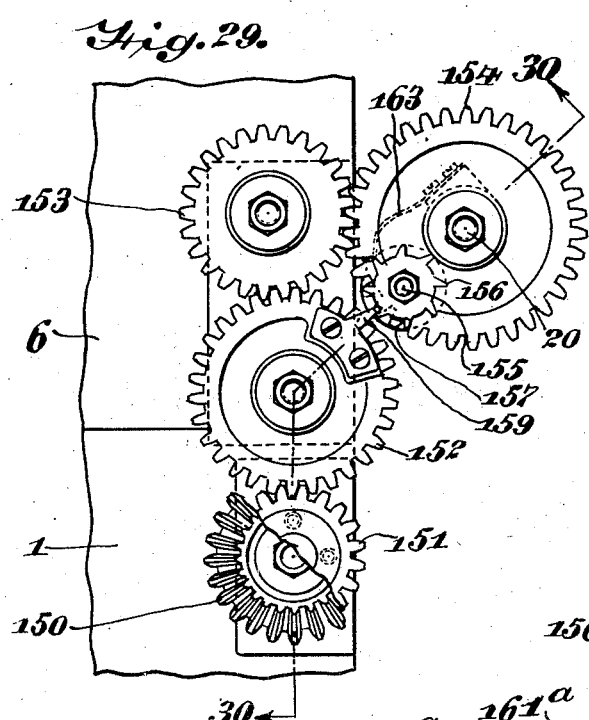
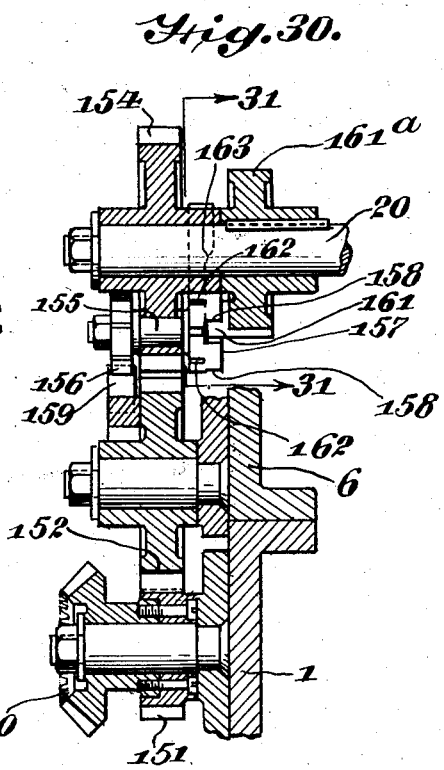
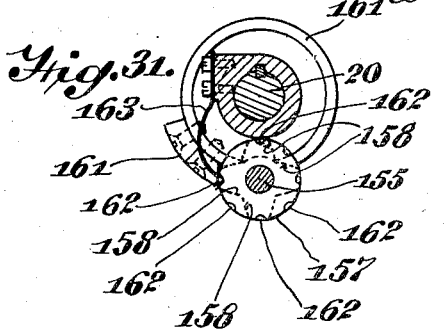
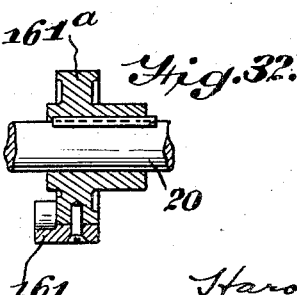
INVENTOR
Harold B. Collins
BY Cyrus N. Anderson
ATTORNEY

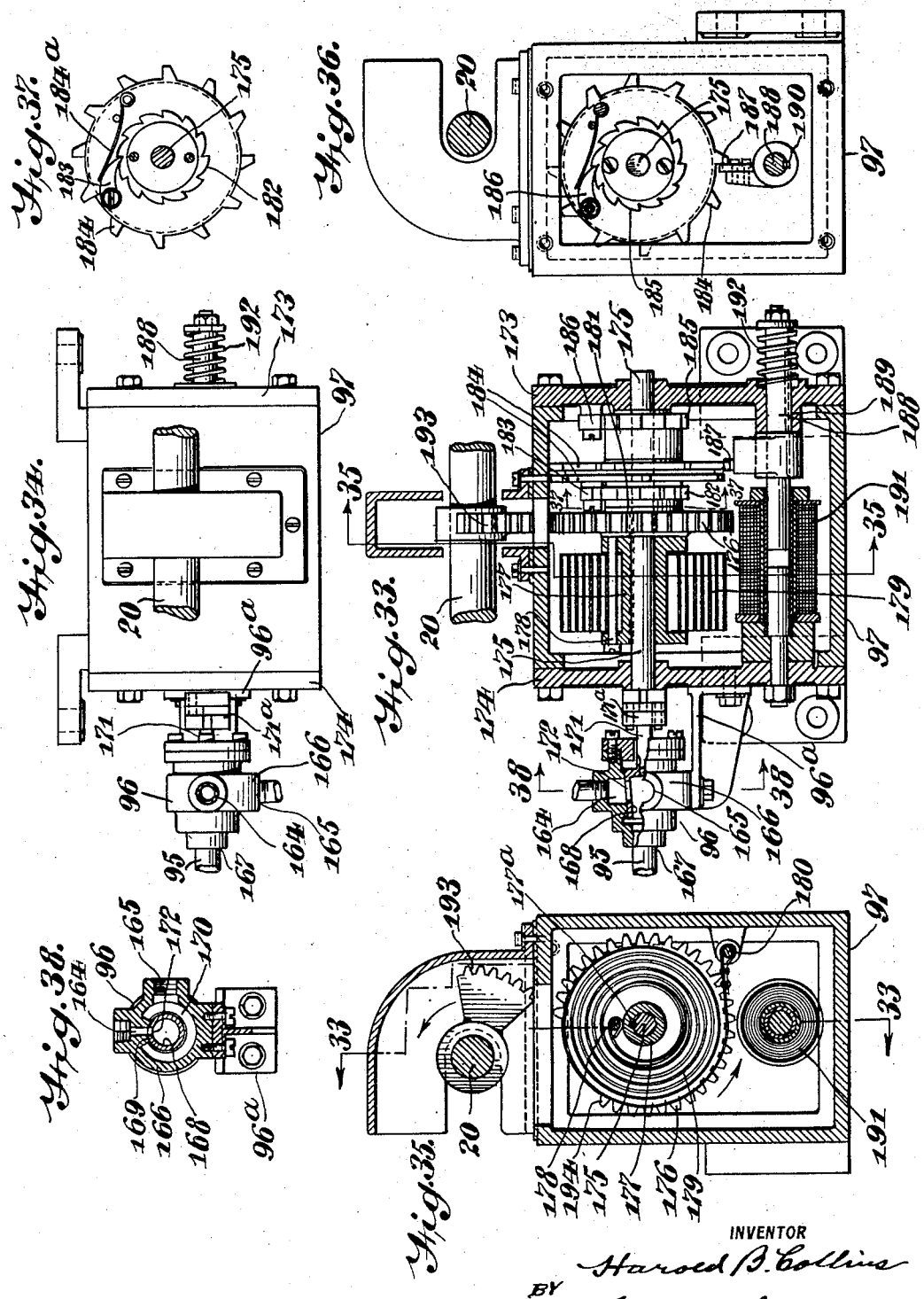

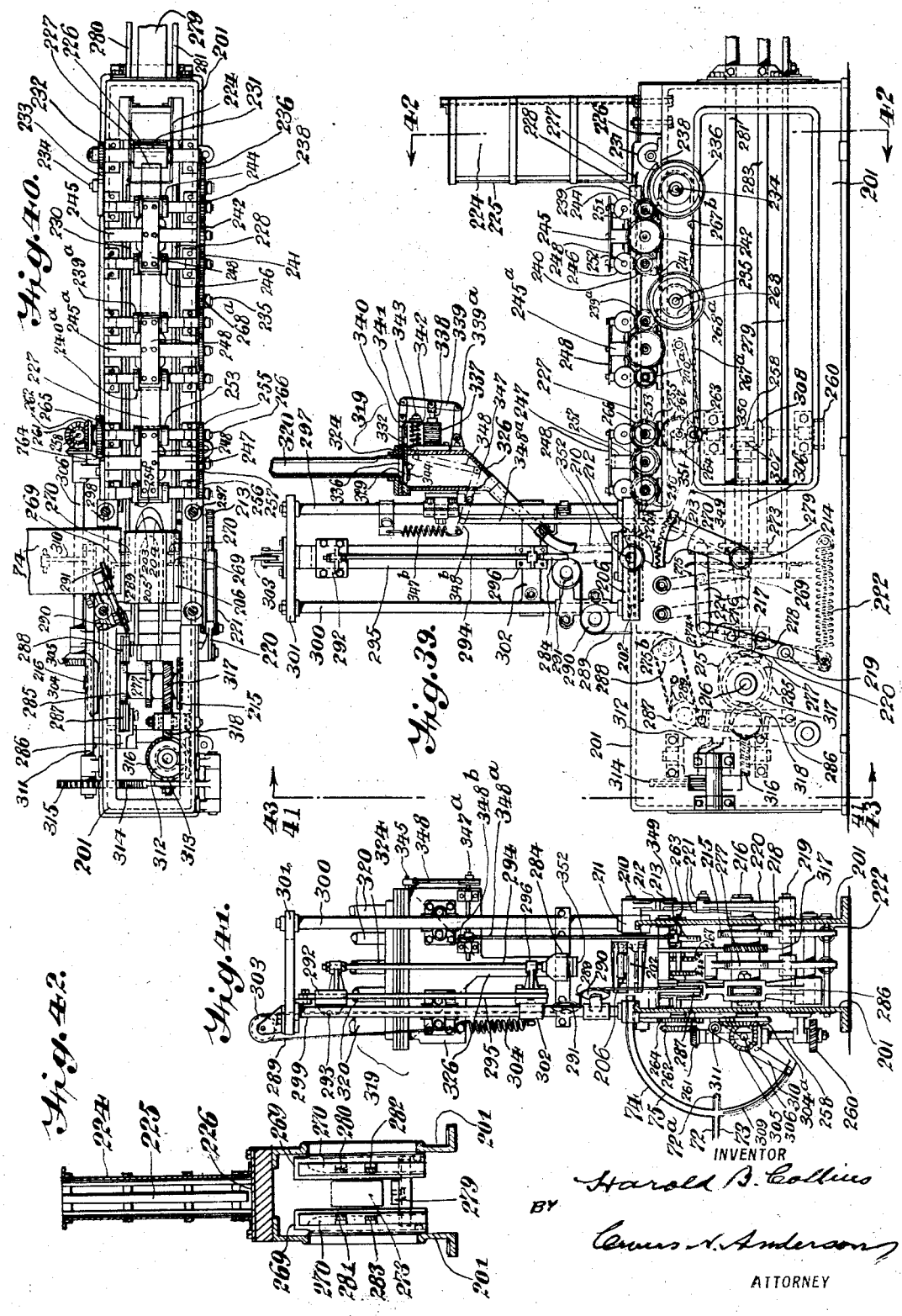

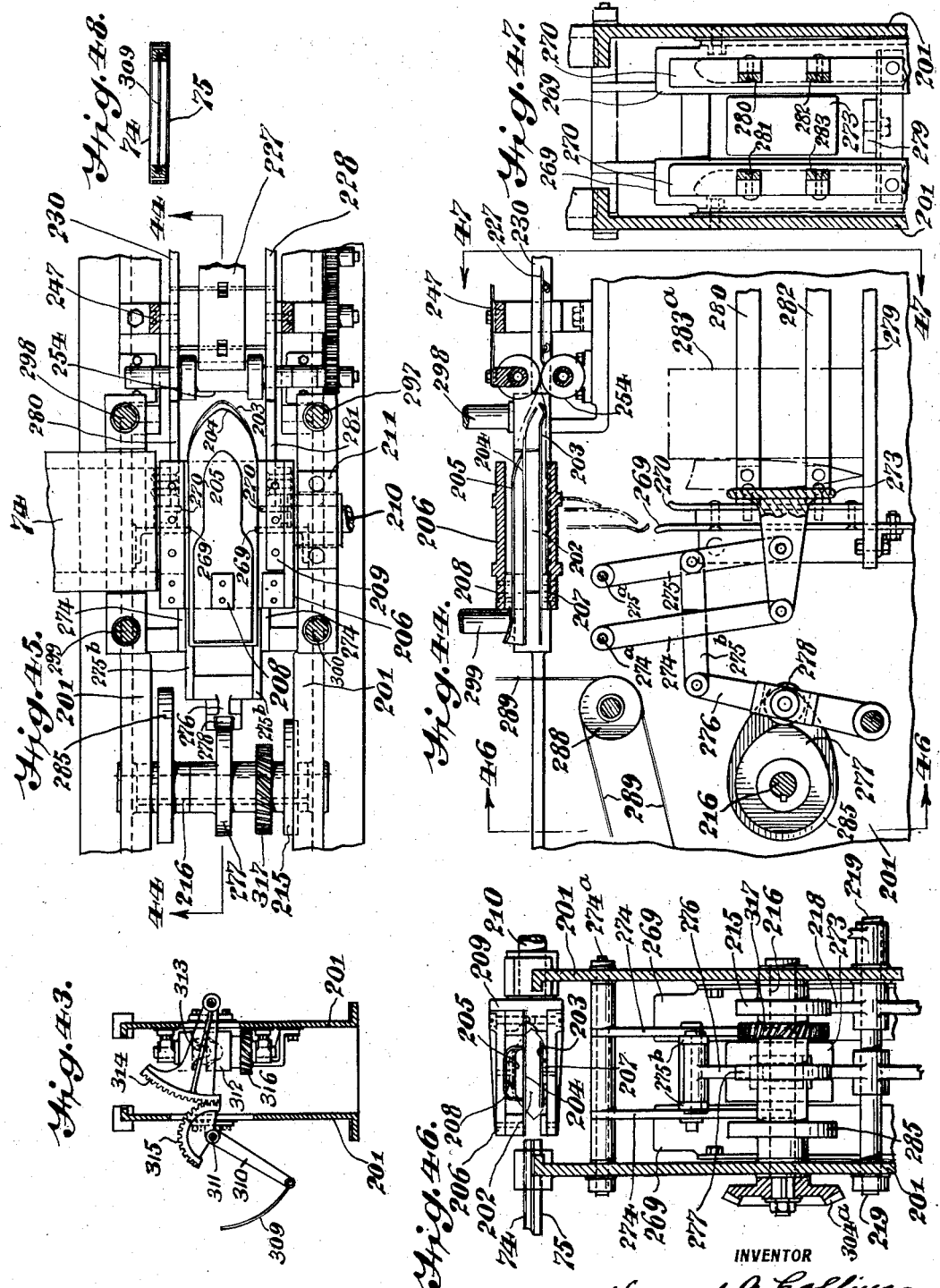

April 1, 1930.  H. B. COLLINS  1,752,784
ENVELOPE FILLING MACHINE
Filed April 30, 1926  14 Sheets-Sheet 12
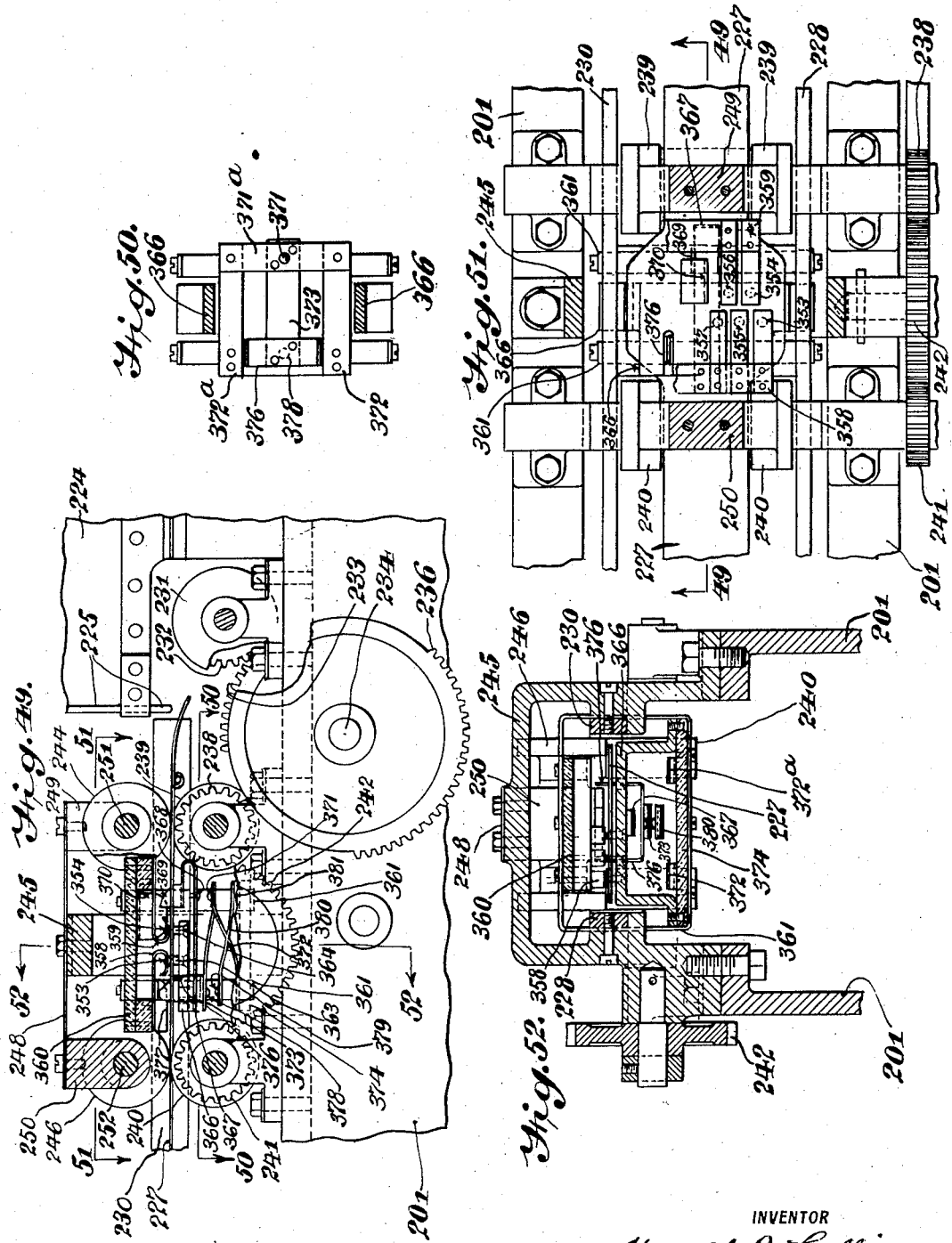

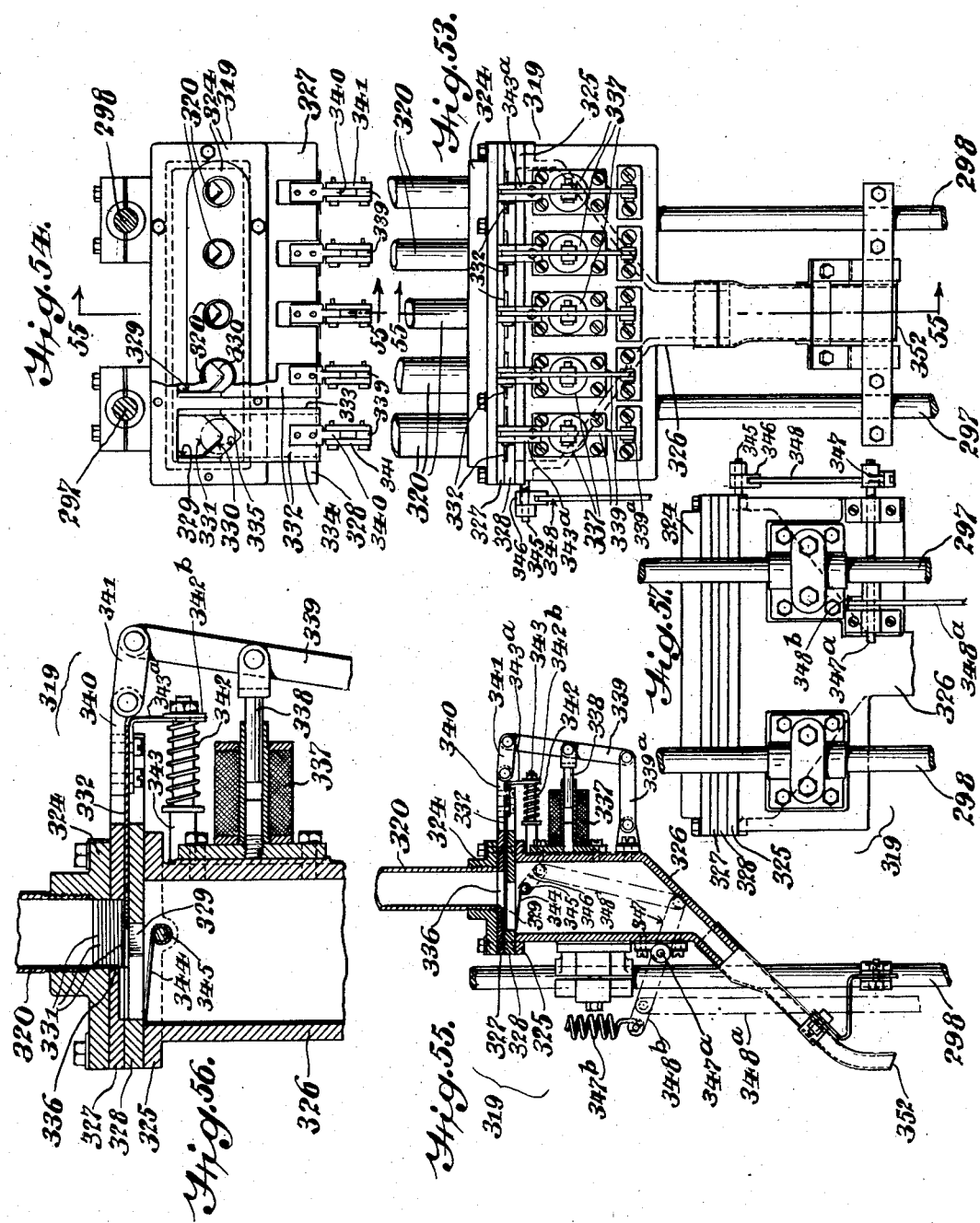

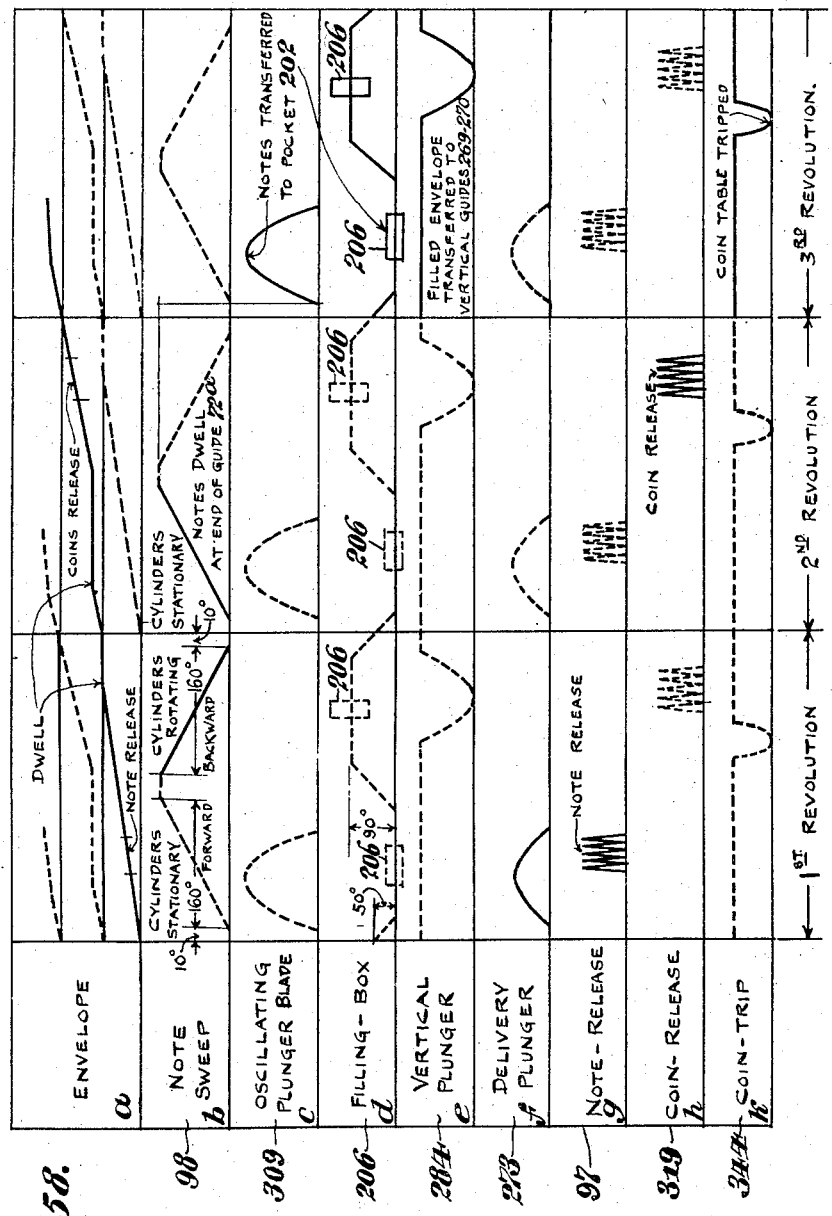

Patented Apr. 1, 1930

1,752,784

UNITED STATES PATENT OFFICE

HAROLD B. COLLINS, OF PHILADELPHIA, PENNSYLVANIA

ENVELOPE-FILLING MACHINE

Application filed April 30, 1926. Serial No. 105,751.

This invention relates to machines for use in the placing or depositing in envelopes or similar containers of currency which may consist of both notes or bills and coins in required amounts for the purpose of paying off a number of employes at the end of a day, week or other period of time, or at any time, or for any purpose.

The general purpose of the invention is to provide a machine which may be employed efficiently for the purpose indicated, thereby enabling the avoidance of the laborious task of filling such envelopes or other containers manually.

One form of machine (which is illustrated in the accompanying drawings) embodying my invention comprises two units. One of these units is provided with a plurality of separate means for holding notes or bills of different denominations or values and with means whereby one or more bills or notes may be extracted or withdrawn from any holder or from a plurality of holders. The other of said units comprises holding means for coins of different denominations or values. The coins necessary to make up any sum may be selected from these holders or containers. The latter unit also contains holding means for the envelopes to be filled. The operation of both the note extracting or selecting means and the means for selecting and releasing coins from their holding means is effected by means the operation of which is controlled by the passage of the envelopes through the second named unit. The bills or notes, the coins and the envelopes are conveyed to a common or central point of the machine where means is provided for effecting the placing or depositing of the currency in the envelopes in the different amounts which may have been selected, the said amounts being controlled by the passage of the envelopes through the second named unit of the machine, which envelopes are provided with means to control the mechanism for selecting the bills or notes and the coins.

The invention in its broadest aspect has for its object to provide a machine of novel construction having means whereby the required amounts may be placed or deposited in successive envelopes or containers as and when the latter arrive at a predetermined selected point in the machine.

It is also an object of the invention to provide a machine having novel means whereby one or more bills or notes may be selected from any one of a number of piles of bills or notes supported in containers, the bills or notes in the different containers being of different denominations or values.

It is also an object of the invention to provide means for conveying the said bills or notes, after selection, to a predetermined point and to fold the same during their passage to such point into a form to facilitate their insertion into envelopes.

Another object of the invention is to provide means whereby the required coins may be selected from a plurality of holders or containers, each holder or container having therein a coin of different denomination or value, and thereafter depositing the same in the same envelope with the bills or notes referred to in the previous paragraph, so as to make up the required amount which is to be placed in such envelope.

A further object of the invention is to provide means whereby the selection of the required bills or notes and coins shall be controlled by the passage of the envelopes into position to receive the bills or notes and the coins so selected and which are necessary to make up the amount which it is desired to place within such envelope.

The foregoing sets forth in a general way the objects of my invention, but other objects and advantages of the invention will be pointed out in the detailed description thereof which follows or will be apparent from such description.

In order that the invention may be more easily understood and a full comprehension of its advantages more readily acquired reference may be had to the accompanying drawings in which I have illustrated one form of machine embodying the principle of the said invention.

In the drawings:

Fig. 1 is a more or less diagrammatic view of that unit of my machine having means for holding a plurality of bundles or packages of bills or notes and having means for withdrawing the said bills or notes from the respective bundles or packages and conveying the same to a central point where they are adapted to be placed in envelopes;

Fig. 2 is a similar view showing the second named unit of the machine embodying my invention having means for holding or containing the envelopes into which the different required amounts of currency are adapted to be placed or deposited and also indicating the mechanism for delivering the coins to the envelopes and also the means for inserting the bills or notes into the said envelopes;

Fig. 3 is a view of a fragmentary portion of the structure shown in Fig. 1, but showing more in detail the means by which the bills or notes, after having been withdrawn or extracted from the bundles or packages previously referred to, may be folded;

Fig. 4 is a view of one side of an envelope into which the required amount of currency is adapted to be inserted, the said envelope being provided with means whereby the operation of the mechanism for selecting the requisite amount of currency in the form of bills or notes and coins may be controlled;

Fig. 4ª is a top plan view of a machine embodying the invention;

Fig. 5 is a view partly in front elevation and partly in vertical longitudinal section of the note holding unit of the machine, the said figure showing only three bill or note holding units;

Fig. 6 is a top plan view of the unit as shown in Fig. 5;

Fig. 7 is a view in rear elevation showing the drive and the bill or note delivery controlling mechanism, portions of the machine being omitted for the sake of clearness of illustration;

Fig. 8 is a transverse sectional view taken on the line 8—8 of Figs. 5 and 6, the note feeding carriage having been moved forwardly from its position as shown in said Figs. 5 and 6 into a position to be shown in this figure;

Fig. 9 is a view in end elevation looking toward the left in Figs. 5 and 6;

Fig. 10 is a vertical sectional view taken on the line 10—10 of Fig. 11 and showing the means for withdrawing the bills or notes from the bundles or packages thereof and conveying them into positions where they may be folded;

Fig. 11 is a top plan view of the bill or note withdrawing and feeding mechanism;

Fig. 12 is a sectional view taken along the line 12—12 of Fig. 10;

Fig. 13 is a horizontal sectional view taken along the line 13—13 of Fig. 10;

Fig. 14 is a view showing more clearly and in detail portions of the feeding mechanism shown in Figs. 10 to 13 inclusive;

Fig. 15 is a view in side elevation of the cover at the rear end or side of the box within which the feeding rollers of the feeding mechanism are mounted;

Fig. 15ª is a sectional view taken on the line 15ª—15ª of Fig. 12;

Fig. 16 is an enlarged view partly in elevation and partly in longitudinal section of one of the collecting cylinders to which the bills or notes are delivered by the feeding mechanism, the said view showing various bill or note controlling and holding instrumentalities mounted upon the said roller;

Fig. 17 is a longitudinal sectional view taken along the line 17—17 of Fig. 16 with certain portions of the structure removed in order that others may be more clearly shown;

Fig. 18 is a view looking toward the left of Fig. 16;

Fig. 19 is a transverse sectional view of the said cylinder taken along the line 19—19 of Fig. 16;

Fig. 20 is a transverse sectional view taken along the line 20—20 of Figs. 16 and 17, showing the grippers of the gripper mechanism in raised or elevated position with respect to the surface of the cylinder;

Fig. 21 is a view in side elevation of a gripper;

Fig. 22 is a view in elevation of a gripper, looking toward the right in Fig. 21;

Fig. 23 is a top plan view of the gripper shown in Figs. 21 and 22;

Fig. 24 is a fragmentary view, partly in side elevation and partly in vertical section, showing means including a carriage for cooperating with the bill or note folding mechanism shown in Fig. 1, and for conveying the folded bills from the bill supplying unit of the machine;

Fig. 25 is a horizontal sectional plan view taken on the line 25—25 of Fig. 26;

Fig. 26 is a view in transverse section taken on the line 26—26 of Fig. 24, the carriage shown in the latter figure having been moved to the right;

Fig. 27 is a horizontal sectional view through the mangle gear axis taken on the line 27—27 of Fig. 24;

Fig. 28 is a horizontal sectional view taken along the line 28—28 of Fig. 24;

Fig. 29 is a view in elevation of certain gearing as seen when looking toward the right end of the unit shown in Fig. 5;

Fig. 29ª is a top plan view of the gear mechanism shown in Fig. 29;

Fig. 30 is a vertical sectional view taken on the line 30—30 of Fig. 29;

Fig. 31 is a view showing in elevation and detail the stop turret and stop shown in Figs. 29 and 30;

Fig. 32 is a sectional view through the drive lug and the circular support therefor taken in a plane different from that in which Fig. 30 is taken;

Fig. 33 is a vertical sectional view of mechanism for controlling the bill or note delivery mechanism, the said view being taken on the line 33—33 of Fig. 35;

Fig. 34 is a top plan view of the structure shown in Fig. 33;

Fig. 35 is a vertical sectional view taken on the line 35—35 of Fig. 33;

Fig. 36 is a view in end elevation of the structure shown in Fig. 33, looking from the right toward the left in said figure, the cover plate being removed so as to show certain of the interior mechanism for controlling the bill or note delivery mechanism;

Fig. 37 is a view in elevation of the escape wheel shown in Figs. 33 and 36, the said wheel being illustrated separately from its coacting mechanism;

Fig. 38 is a view in transverse section of the vacuum controlling valve taken on the line 38—38 of Fig. 33;

Fig. 39 is a view partly in front elevation and partly in vertical section of the envelope controlling and envelope filling unit of the machine;

Fig. 40 is a top plan view of the unit shown in Fig. 39, portions of the mechanism being omitted for the purpose of more clearly showing other portions thereof;

Fig. 41 is a view in transverse sectional elevation taken on the line 41—41 of Fig. 39, with certain parts of the mechanism removed;

Fig. 42 is a view in transverse sectional elevation taken on the line 42—42 of Fig. 39;

Fig. 43 is a view in transverse sectional elevation also taken on the line 41—41 of Fig. 39, but showing the bill or note transfer cam and connections which are omitted from Fig. 41;

Fig. 44 is a view in sectional elevation, showing certain details of construction of the envelope filling mechanism, the said view being taken on the line 44—44 of Fig. 45;

Fig. 45 is a top plan view showing certain of the mechanism illustrated in Fig. 44, other parts of the mechanism shown in said Fig. 44 not being shown;

Fig. 46 is a transverse view in sectional elevation taken on the line 46—46 of Fig. 44;

Fig. 47 is a view in sectional elevation taken in a plane to the right of that in which Fig. 46 is taken and looking in the opposite direction, the said figure showing the envelope delivery guides;

Fig. 48 is a transverse sectional view of the arcuate-shaped folded bill delivery guides shown in Fig. 1 of the drawings;

Fig. 49 is an enlarged view, partly in elevation and partly in section of a fragmentary portion of the machine showing the electric control and the intermittent drive, the sectional part of said figure being taken along the line 49—49 of Fig. 51;

Fig. 50 is a view taken on the line 50—50 of Fig. 49, certain mechanism being omitted;

Fig. 51 is a view, partly in top plan and partly in horizontal section, taken along the line 51—51 of Fig. 49;

Fig. 52 is a view in transverse sectional elevation taken along the line 52—52 of Fig. 49;

Fig. 53 is a view in side elevation of the coin delivery mechanism, the said view showing the arrangement of solenoids and trip blades;

Fig. 54 is a view in top plan of the mechanism shown in Fig. 53, a portion of the coin holder plate shown in Fig. 53 being broken away;

Fig. 55 is a vertical sectional view taken on the line 55—55 of Figs. 53 and 54;

Fig. 56 is a vertical sectional enlarged view, similar to that shown in Fig. 55, but showing only a portion of the mechanism shown in the latter figure;

Fig. 57 is a view in side elevation looking at the rear of Figs. 53 and 54, or from the left toward the right in Fig. 55, portions of the mechanism being omitted; and Fig. 58 is a view including a series of diagrams intended to indicate the motions of the moving parts of the mechanism plotted with respect to the revolution of a primary cam shaft of the envelope feeding and filling unit of the machine.

In Fig. 1 of the drawings I have shown five separate holders or containers for the bills or notes. The said holders or containers are adapted to hold respectively one, two, five, ten and twenty dollar bills. In the remaining figures of the drawings where the said holders or containers are included, only three are shown merely for purpose of illustration. The showing of additional holders or containers and the mechanism associated therewith would be a mere duplication and is not necessary for a complete and full understanding of the invention.

With respect to the figures of the drawings, it may be noted that Figs. 1 to 4 inclusive are more or less diagrammatic views and are intended to illustrate in a general way the method of operation of the machine.

Fig. 4ª stands by itself and is presented mainly for the purpose of illustrating the relationship of the units to each other.

Figs. 5 to 9 inclusive may be grouped together as indicating more or less in detail the construction of the bill or note holding and feeding mechanism.

Figs. 10 to 23 inclusive may be grouped together and illustrate the details of the mechanism for withdrawing the bills or notes from their holders or containers, Figs. 16 to 23 depicting the details of the note collecting cylinder and the mechanism immediately associated therewith on an enlarged scale.

Figs. 24 to 28 inclusive illustrate certain details of construction of the mechanism for removing the bills or notes from the collecting cylinders and conveying the same through the bill or note holding and feeding unit toward the mechanism provided in the other unit of the machine for depositing the bills and coins within envelopes.

Figs. 29 to 32 inclusive are views on an enlarged scale of the intermittently operating drive mechanism for driving the bill or note collecting cylinders.

In Figs. 33 to 38 inclusive, which may be grouped together, is depicted in detail the bill or note delivery control mechanism.

In Figs. 39 to 48 inclusive is depicted the envelope filling and delivery mechanism.

In Figs. 53 to 57, which may be grouped together, is depicted the coin delivery mechanism which is electrically controlled, as already indicated.

THE GENERAL CONSTRUCTION AND OPERATION

Before proceeding with a description in detail of the above figures of the drawings depicting a machine embodying the invention I shall describe somewhat generally the machine and its operation.

In the usual case the machines will each be provided with five bill or note holders 7, the said holders respectively holding notes or bills of different denominations, as already indicated. The bills or notes are stacked flat in the respective holders. From the respective holders 7 they are drawn one at a time into contact with rotating bill or note collecting cylinders 22. If the bills or notes of a holder are released one bill or note is drawn therefrom for each revolution of the cylinder associated with the said holder. If the bills or notes of a holder are not released, the collecting cylinder associated therewith revolves idly. When the end of a bill or note reaches a cylinder 22 it is immediately clamped to the periphery thereof in a manner similar to that in which a sheet is held upon the cylinder of a rotary printing press. One bill or note may be drawn from each holder or container, or a plurality of bills or notes may be drawn successively from one or more holders or containers, or notes or bills may be drawn from some of the containers and not from the others, depending upon the punching of the envelopes into which the currency is to be deposited. As already indicated, the envelopes are provided with means whereby the mechanism for selecting the bills or notes is controlled.

During the operation of the machine and after the bills or notes as required have been collected upon the collecting cylinders 22 the rotation or revolution of the said cylinders is interrupted in such position that the middle lines of the bills or notes thereupon are located in the same horizontal plane, which plane is located intermediate the guides 72 and 73, between which the bills are carried from the left toward the right (having reference to Fig. 1) to the semi-circular guides 74 and 75. The bills or notes are removed from the collecting cylinders 22 and are carried or conveyed forwardly by a sweep or plunger 98. The guides 72 and 73 are provided with arc-shaped extensions which project in opposite directions from positions in adjacent relation to the collecting cylinders 22, which projections are spaced from and partially encircle or surround the cylinders 22 to form annular guiding chambers or passageways. The collecting cylinders 22 are provided with diametral slots which, when the revolutions of said cylinders are interrupted to permit the removal of bills or notes therefrom by the plunger or sweep 98, occupy positions in the horizontal plane, previously referred to.

It will be seen, therefore, that by the means described, and as shown in Fig. 1, a free passageway between and through the collecting cylinders is provided, as well as around the same. As the plunger or sweep 98 travels through the horizontal passageway, between the guides 72 and 73, it engages any bills or notes which may be carried upon the surfaces of the collecting cylinders 22, folds the same and conveys them forwardly to the right hand end of the said passageway. The bills or notes are folded in the middle.

After the plunger or sweep 98 has reached the end of its movement toward the right to convey folded bills or notes into position extending across the passageway between the arc-shaped guides 74 and 75 it is returned by suitable mechanism along the dotted lines $a$ to its initial position at the left hand side of the bill or note feeding unit of the machine, as indicated in Fig. 1. The operations of stripping or removing the bills or notes from the collecting cylinders 22 by the plunger or sweep 98 and the returning of the latter to its initial position are repeated one after another until the operation of the machine is discontinued.

The guides 72 and 73 are connected at their right hand end so as to form a closed pocket 72ª. This closed end is located in adjacent relation to and beyond the guides 74 and 75. The passageway formed by the guides 74 and 75 is in communication with and intersects or crosses the passageway formed by the guides 72 and 73. After one or more folded bills have been carried into position across the passageway formed by the guides 74 and 75 and the sweep or plunger 98 has been disengaged therefrom a sweep or plunger 309 operating between the arc-shaped guides 74 and 75 moves forward and engages and again folds the bills or notes and conveys them upwardly and deposits them within a pocket 202 of the envelope filling and discharge unit.

By reference to Fig. 2 it will be seen that the pocket 202 comprises two thin resistant metal blades 203 and 204 and a third blade 205 mounted upon the latter. The respective blades are supported at their left hand end portions in a box like member 206 as shown in Figs. 39 and 44 and as will be described hereinafter in more detail, having reference to Fig. 2 of the drawings, while the remaining portions thereof are free. The blade 204 is shorter than the blade 203 and is bent downward at its right hand end, having reference to Fig. 2 of the drawings, nearly into contact with the said blade 203. The latter is bent upward slightly at its right hand end, as is clearly indicated in Figs. 2 and 44.

The envelopes are piled or stacked in a bin or holder 224 with the open ends thereof facing toward the feed rollers 239. From the bin or holder 224 the envelopes are fed forwardly through the envelope feeding unit of the machine toward a central delivery point in adjacent relation to the pocket 202, previously referred to. The passage of the envelopes through the machine controlls the operation of the note selecting mechanism, previously referred to. As the envelopes are carried forward the slightly protruding lower lips thereof contact with the right hand end of the lower blade 203 and are depressed, which causes the upper lips of the envelopes to rise. During the further movement of an envelope, under the influence of the feeding rollers 239, it is opened and thrust upon the blades 203, 204 and 205 upon which it is held by friction. The blades 203, 204 and 205 are mounted upon a carrier or support 206 (Fig. 44) which is rotatable through an angle of 90°. When so rotated an envelope which may be mounted thereon is caused to assume a vertical position with the open end at the top, as indicated by the dotted lines immediately above the vertical guides 269 and 270, as shown in Fig. 2 of the drawings. While in this position coins previously released from their respective holders are released and are delivered thereinto from a nozzle 352 of the coin distributing apparatus. Entrance of the coins into the envelopes is facilitated by the presence of the blade 205 mounted upon the blade 204. The relation of these two blades to each other is such as to effect opening of the envelopes in a manner to form a clear space or opening through which the coins may enter.

The guides 269 and 270, previously referred to, which are arranged in pairs engage the opposite edge portions of the envelopes which occupy vertical positions, as indicated in Fig. 2 of the drawings, during the filling operation and afterwards. After having been filled the envelopes are pushed to the right, having reference to Fig. 2 of the drawings, along guides 279 by means of a plunger 273. The envelopes are maintained in vertical position by a movable block 283ª. The vertical envelopes and the block 283ª are moved along upon the said guides step by step under the influence of the plunger 273, previously referred to.

The coin delivery mechanism designated as a whole by the reference number 319 is provided with holders for fifty, twenty-five, ten, five and one cent pieces. The required coins are released as the holes in the envelopes register with electrical contacts which are located between the two intermediate pairs of envelope feeding rollers 239ª and 240ª (shown in Fig. 2). These rollers, together with other pairs of rollers, operate to feed the envelopes from the bin or holder 224 to the note pocket 202 and onto the blades 203, 204, and 205, previously referred to. Similar contacts are mounted between the right hand two pairs of feeding rollers (having reference to Fig. 2 of the drawings) 239 and 240, which are located in adjacent relation to the bin or holder 224. When the holes in the envelopes register with these contacts the circuits are closed which operate to control the note releasing mechanism, previously referred to. The mechanism of the envelope feeding unit of the machine is so arranged and so operates as to cause the envelopes to dwell after each operation of the releasing means of the bill or note releasing mechanism in order to properly time the arrival of the released notes to meet the envelopes and the coins at the filling point so that the said bills or notes and coins may be inserted or deposited in the said envelopes.

The holes or perforations in the envelopes are arranged so as to complete the circuits for controlling the coin releasing mechanism and the bill or note releasing mechanism in a manner to release and deliver to the filling point the amounts required for each envelope. The holes, as shown in the envelope which is illustrated in Fig. 4 of the drawings, are arranged so as to release seventy-eight dollars ($78) in bills or notes and ninety-one cents (91¢) in coins.

The general plan of the machine and its operation having been indicated I shall now proceed with a description of the respective groups of mechanism hereinbefore referred to in the order in which such mechanisms have meen mentioned.

1. THE NOTE COLLECTING UNIT

The note collecting unit of the machine comprises a frame having a base 1 (Figs. 4ª to 7) upon which is mounted an upper frame divided into sections. In the construction as illustrated only three sections are shown, which sections are identified by the numerals 2, 3 and 6, 2 and 6 designating the two end sections and the numeral 3 the intermediate section. In the machine as actually constructed there would be included two additional intermediate sections, making a total of five, but as these additional intermediate sections, if shown, would be mere duplicates of the intermediate section which is shown, they have, for the sake of simplicity, been omitted.

a. The note magazines

The holders or containers 7 for the bills or notes are mounted on bases 8 which are in turn fitted to or mounted upon ways or guides 9 arranged longitudinally of the bill or note collecting unit along the top of the upper frames 2, 3 and 6, and, of course, along the top of the additional upper intermediate frames referred to, but not shown. These ways are not continuous, but each of them is of sufficient length to permit the bin supported thereon to be moved back and forth a distance of several inches. Racks 10 which are attached to one side of the respective bill or note holders or containers 7 engage gears 11 (Figs 11 to 14) mounted upon suction rollers 12. Horizontally disposed levers 13 are mounted upon the upper frames of the bill or note collecting unit of the machine, previously referred to. One of these levers is associated with each of the sections of the upper frame and each is mounted at its middle upon a stationary pivot pin 14. One end of each lever is connected by means of a link 16 to a longitudinally extending coupling bar 15 (Figs. 6, 7 and 8) located at the upper edge of the rear side of the said unit, while the opposite end of each lever is connected by means of a short link 17 to the base 8 of one of the bill or note holders or containers, previously referred to. Upon oscillation of the levers 13 reciprocating or back and forth movement of the bases 8 and the bill holders mounted thereon is effected. Oscillation of the said levers is effected by a reciprocating movement of the coupling bar 15 effected by means of a crank shaft 18 (Fig. 7) through a connecting rod 19, the latter having connection at one end with the crank and at its other end with the said coupling bar. The crank shaft 18 is driven from the drive shaft 20 through the action of miter gears 21. The drive shaft 20 also drives the collecting cylinders 22 through or by means of the helical gears 23 and 24 (Figs. 8 and 12). The bill or note holders 7 and the collecting cylinders 22 having a common actuator, namely, the drive shaft 20, it is apparent that the said holder may be caused to reciprocate in harmony with and in proper correlation to the rotation of the said collecting cylinders.

b. The collecting cylinders

Upon reference to Fig. 8 of the drawings it will be noted that each collecting cylinder 22 is mounted or supported upon a bearing at one end only. The purpose of this is that means may be provided for permitting the free passage of the plunger or sweep blade, previously referred to, for removing from the collecting cylinders bills or notes which have been released and removed from the bill or note holders and deposited upon the said cylinders. The rear end of each of the collecting cylinders 22 is provided with gear teeth 25 on a pitch-circumference which coincides with the periphery of the cylinder. The gears 25 are in mesh respectively with idler gears 27 which in turn engage gears 26ª mounted upon the bill feed rollers 26 (Figs. 10, 11 and 12). The feed rollers are driven at the same speed or velocity as that of the collecting cylinders 22. A pressure roller 28 (Fig. 10) constituting a part of each bill or note delivery mechanism associated with each bill or note holder 7 is supported upon the upper free end of a swinging frame 29. Each of the said rollers 28 is held yieldingly against its associated feed roller 26 by the action of a flat spring 30 which is fixed or secured to the swinging frame 29. The respective rollers 28 are rotated by reason of their frictional engagement with the feed rollers with which they are associated. The pressure roller 28 is provided with a relatviely wide groove extending around the middle portion thereof in which runs a belt 28ª. Said belt extends over a pulley 29ª mounted upon the arbor 30ª of the swinging frame 29. A bill or note which may be delivered to these rollers 26 and 28 of the respective bill or note feeding mechanisms is firmly held thereby and urged or fed forward onto the associated collecting cylinder 22. Located in operative relation to the respective collecting cylinders 22 are gripper actuating cams 31 and 32 (Figs. 10 and 12). These cams are mounted on studs 33 and are driven by gears 34. The respective gears are in engagement with the teeth of the respective gears 25 of the collecting cylinders 22. The gripper cams 31 and 32 are alike and are set or located at an angle of 180° with respect to each other. The number of teeth of the gear 34 for rotating the cams 31 and 32, by means of which the tappets 35 and 36, which are mounted radially upon the collecting cylinders 22, are operated, is so chosen, with relation to the number of teeth upon the gear 25 that the said tappets engage the said cams alternately; that is to say, the cam 31 makes one revolution after contacting with or engaging the tappet 35, during which it does not contact with said tappet, but during such revolution the cam 32 engages or contacts with the tappet 36. In the next revolution the cam 32 does not contact with the tappet 36, but the cam 31 contacts with the tappet 35 and so on. Upon engagement of the tappets 35 and 36 by the cams 31 and 32 the former are caused to move inwardly and radially of the collecting cylinders. The tappets 35 and 36 are so coupled to the pairs of grippers 37 and 40, and 38 and 39 respectively (Figs. 16 to 20) by the interior mechanism of the collecting cylinder with which they are associated that first the outer pair 37 and 40 open for the reception of a bill or note and at the next revolution the inner pair 38 and 39 open for the reception of the succeeding bill or note which is fed to the said cylinder. The purpose of the two pairs of grippers is to hold in place the bill or note already withdrawn from a holder and deposited upon a cylinder while the other pair of grippers is raised to receive the next arriving note.

The collecting cylinders, the details of which are illustrated in the enlarged views of Figs. 16 to 23 inclusive, each consists essentially of a cylindrical shell provided at one end with the toothed gear 25, already referred to, mounted upon the stub end 41 of a spindle 42, the opposite end of which cylinder is free and unsupported, as already indicated. Each cylinder is provided with two thin partitions 43 and 44 which are supported in spaced parallel relation to each other on opposite sides of a central diametral longitudinally extending plane, which partitions extend inward from the free end a distance somewhat greater than the width of a bill or note. The space between these partitions is indicated at 45 and is of a width sufficient for the passage therethrough of a sheaf of a number of notes which may be removed from the collecting cylinders 22 and folded once over the plunger or sweep 98. Each of the collecting cylinders 22 comprises segments 46 and 47 which are removable. The shell of each cylinder beyond the inner ends of the partitions 43 and 44 is continuous.

The pairs of grippers 37 and 40, and 38 and 39 are mounted upon a long arbor 48 about which they may have a limited angular movement. In addition to such movement, the said grippers are capable of moving outwardly from the surface of the cylinder against which their points normally bear. Hubs 49 are mounted upon the arbor 48 carried by each cylinder. These hubs are provided with projections 50 having openings therethrough through which the shanks 51 of the grippers may slide. Springs 52 coiled about the said shanks and each spring contacting at its upper end with the projection 50 and at its opposite end with a sleeve secured upon the lower end of the shank of the associated gripper, as shown in Figs. 21 and 22, tend to and operate normally to hold the said grippers in depressed condition with the gripping or hook ends thereof in engagement with the exterior surface of the cylinder. The hubs upon which the middle pair of grippers 38 and 39 are mounted are loose upon the arbor 48 and are rigidly connected with a lever 53 which also is loosely mounted upon the said arbor between the said grippers. The said lever 53 is coupled by means of a link 54 to the outer end of a lever or arm 55 which is keyed to an arbor 56 also mounted within the collecting cylinder 22. A lever 57 is keyed to the arbor 56 and is located in the plane of the axis of the tappet 35 (Figs. 16 and 17). The outer swinging end of the lever 57 is in turn connected by means of a long link 63 to the eye 59 upon the inner end of the tappet 35. As a result of this connection an upward radial movement of the tappet 35 as a result of its contact with the cam 31 will effect rotation of the grippers 38 and 39. The outer grippers 37 and 40 and a lever 60, similar to the lever 53, are keyed to the arbor 48. The lever 60 is coupled to an arm or lever 61 by means of a link 62. The said arm or lever 61 is loosely mounted upon the arbor 56 and is connected at its middle point to one end of a long link 58, the opposite end of which is connected to an eye 64 of the tappet 36, previously referred to. Actuation and operation of the outer grippers 37 and 40 are effected by contact of the tappet 36 with the cam 32, previously referred to. Such contact effects inward radial movement of the tappet and such movement through the link 58 causes pivotal movement of the lever or arm 61 to effect rotative actuation of the said grippers 37 and 40.

Outward actuation or movement of the grippers with respect to the collecting cylinders 22 is effected by means of cam projections 66 (Figs. 18 to 22) acting upon the ends of pins 67 which extend transversely through the lower ends of the shanks of the grippers. These pins also operate to secure sleeves 67$^a$ upon the lower ends of the said shanks. The cam projections (in the form of plates) 66 are mounted upon arms 69, each of which is pivoted at one end on an arbor 71. The opposite free ends of said arms rest upon the arbor 56, previously referred to and are held yieldingly against the same by leaf springs 69$^a$. The top surfaces of the cam projections 66 are inclined, as shown in Fig. 20 of the drawings. Normally the ends of the pins 67 occupy positions underneath the said cams. It will be understood that the cams are free to move upwardly during the first part or portion of the pivotal movements of the gripper shanks. If, therefore, a tappet 35 or 36 is actuated, one or the other of the pairs of grippers 37 and 40, and 38 and 39 is pivotally actuated. During the first portion of the pivotal movement of the grippers (in a clockwise direction) there is only pivotal movement, so that the gripper fingers of the grippers of the pair of grippers being actuated are but slightly elevated from the portions of the exterior surface of the collecting cylinder 22 with which they are in contact. This is in order that the holding action of the other pair of grippers upon bills or notes which may be held thereby may not be disturbed. Normally, one end of each of the pins 67 is located underneath its associated cam projection 66. Consequently, upon the first part of the pivotal movement of the shanks of the grippers the cams and the supports therefor are elevated. After the lower ends of the shanks of the pair of grippers have moved forward toward the left (see Fig. 20) a certain distance the pins clear the ends of the cams associated therewith and the arms 69 under the pressure of the leaf springs 69ª are released and returned to their normal positions, so that upon return of the lower ends of the grippers toward the right to normal position the grippers are elevated to the full line position indicated in Fig. 20. Such elevation is due to contact of the ends of the pins 67 with the top sides of the cams 66. The path through which the gripping ends of the gripping fingers move is indicated by dotted lines at 68 in Fig. 20. Upon the complete return of the grippers-to normal position the pins 67 pass beyond the right hand edges (see Fig. 20) of the cams 66, so that the said grippers are permitted to move inwardly to normal closing position under the influence of the springs 52.

c. The note or bill guides

As has been pointed out previously, the bill guides 72 and 73 are arranged in horizontal position. A central plane through the space between the said guides practically bisects the collecting cylinders 22. At the right hand end of the machine a similar pair of guides 74 and 75 of arc-shape is shown. These guides are arranged to extend at right angles to the direction of the guides 72 and 73. The upper ends of these guides terminate in cooperative relation to the envelope filling means, previously referred to. This means is located near the inner end of the envelope feeding and filling unit of the machine.

The method of removing the bills from the holders 7 by means of suction is substantially as is described in Letters Patent of the United States, No. 1,039,521.

In the construction of machine embodying the invention the bill supplying unit should be provided with five bill or note holding, supplying and feeding mechanisms.

d. Mechanism for feeding the notes to the collecting cylinders

I shall now proceed with a description of one of these bills or note feeding mechanisms. The several mechanisms associated with the several bill or note holders or containers 7 are identical in construction and operation. Each mechanism comprises a box 75ª (Figs. 4ª and 6) open at its top and bottom, which is fitted into an opening of the frame of the bill or note feeding unit of the machine at a point above the collecting cylinder 22. The front and back faces 77 and 78 (Figs. 11 and 12) of the said box support the journals of the rotating parts therein. The back face 78 should be detachable for the purpose of facilitating the assembling of the feeding element. The feeding means within the box 75ª comprises a suction roller 12 consisting essentially of a tube mounted or supported on journals at its opposite ends. The said tube is provided with a narrow slot 79 at its central portion. When a vacuum or a partial vacuum is established within a roller 12 the lowermost bill or note within the holder associated with the feeding mechanism is adapted to be held by suction when the said slot moves into position underneath the said bill and is removed by the rotation of the said roller. Rotation of the roller is effected by means of a rack 10 which reciprocates with the reciprocating bill holder, as previously described. Removal of the lowermost note is effected without disturbing those above. As the bin moves forward toward the right the upper bills or notes above that held by the suction roller pass over the separating blade 80 secured at one end to the roller box 75ª. The opposite end of said blade extends inwardly of the roller box as shown in Figs. 10 and 11. When the note holder 7 is in its initial or extreme left hand position the ends of the bills or notes project a short distance beyond the line of contact of the bottom note with the vacuum or suction roller 12. To insure certainty of action the protruding end of the stack of notes is supported by a toe or short projection at the lower end of a depending arm 81 (Figs. 5 and 7 to 9) which is supported by an arbor 82 to which it is keyed. Adjustably connected with the same arbor is another depending arm 83, the lower end of which is adapted to engage a stop 84 upon the return of a bill holder to its initial or return position. The contact of the said last mentioned arm effects pivotal movement of the arbor 82 to cause movement of the lower end of the arm 81 to release the bills and permit the lowermost of the bills to contact with and rest upon the vacuum or suction roller 12.

The space between the roller 12 and the feeding roller 26 is bridged by two guide strips 85 and 86 (Figs. 10, 11 and 14). The space between the feed roller 26 and the collecting cylinder 22 is bridged by a single guide strip 88 located centrally of the lengths of the said roller and collecting cylinder. The suction roller 12 and the feed roller 26 are provided with shallow grooves within which the guide strips are located. The said strips extend partially around the roller and collecting cylinder and are flush with the surfaces thereof.

Air is exhausted from the vacuum or suction roller 12 through the nozzle of an air cap bearing 90 which is adapted to communicate with the interior of a hollow journal 91 (Figs. 12 and 15ª) through an opening 92 in the latter. At the proper point in the rotation of the journal 91 the opening or orifice 92 is closed with respect to the vacuum nozzle and is placed in registry with an orifice 93 in the air cap bearing 90 which is open to the atmosphere. When this happens, a note which has been held to the suction roller 12 by suction is released and is free to be fed forward by the feeding rollers. A flexible tube 94 connects the nozzle of the air cap bearing with the inlet of a vacuum line 95 (Figs. 4ª, 5 and 7) which extends to a vacuum control valve 96 (Fig. 7). The latter is operated by the note release mechanism 97 with which it is connected and associated. The details of the note release mechanism will be hereinafter described in detail.

*e. The note collector or sweep mechanism*

The plunger or sweep 98 which is arranged to travel in one direction between the guides 72 and 73 is mounted upon the outer end of a pivoted or swinging arm 99 (Figs. 4ª, 5 and 7 to 9). This arm is pivoted at its opposite end at 100 to a sliding or traveling carriage 101. The carriage is fitted to slide or travel along a bar 102 which extends throughout the length of the frame of the bill or note feeding unit of the machine, in parallel relation to a horizontal line connecting the centers of the front ends of the collecting cylinders 22. The plunger or sweep 98 is maintained in proper vertical position between the guides 72 and 73 by a roller 103 (Figs. 4 to 6, 8, 9 and 24) mounted upon the outer end of an arm 99, which roller bears upwardly against a roller guide 104. The upward pressure of the roller against the guide 104 is maintained by the action of springs 105 and 106 (Figs. 24 to 26). These springs are attached at their upper ends to pins 107 and 108 located in horizontal spaced relation to each other adjacent the upper end of the pivoted arm 109. The pins 107 and 108 are located equal distances from the axis of the arbor 110 upon which the arm 109 is pivotally mounted. The lower ends of the springs 105 and 106 are secured to pins 111 and 112 which project from a bar 113 which is mounted upon the front side portion of the carriage 101. The bar 113 is adapted to have a limited sliding movement with respect to the carriage. The length of the bar 113 exceeds the length of the carriage by an amount somewhat greater than the required movement of the pins 111 and 112. When the carriage is near the end of its backward or left hand movement the protruding end of the bar 113 strikes a stationary stop 114 which causes the bar to move forward or toward the right with respect to the carriage. This movement of the bar causes the resultant force due to the tension of the springs to pass to the right of the axis of the pivot 110. The arm 109 and the arm or lever 99 are coupled together by the engaging gear segments 117 and 119 so that the force resulting from the tension of the springs exerted on the right hand side of the pivot 110, as stated, will cause the arm 109 to move downward or toward the right, which causes the arm 99 to move in an opposite direction, or upwardly. This causes the roller 103 to contact with and bear against the roller guide 104. At the end of the forward movement of the carriage 101 toward the right the protruding bar 113 contacts with a stationary stop 115 (Figs. 4ª to 6) which causes movement of the bar 113 rearwardly with respect to the carriage, so that a reverse movement of the arms 109 and 99 is effected to cause the roller 103 to contact with the lower roller guide 116 during the return or backward movement of the carriage 101. The latter guide is located in a level or plane below the collecting cylinders 22, which plane extends parallel to the horizontal plane of the central axes of the said cylinders, except the inclined portions thereof at its opposite ends (Fig. 5). Openings 73' near the opposite ends of the lower bill or note guide 73 permit passage of the plunger or sweep 98 into positions to and from a position between the planes of the said guides 72 and 73.

The carriage 101 derives its reciprocating movements from a mangle gear drive (Figs. 5, 24 and 26) of which 118 is the rack and 121 the gear. The rack is mounted within a frame 120 and is of suitable length and shape to impart to the plunger or sweep its proper movements. The gear 121 is mounted on the outside of the oblong casing 122 of the mangle gear structure, which casing is supported at a distance from the point of connection of the said gear 121 upon the projecting end of an arbor 123 mounted upon the carriage 101. The said casing constitutes the usual swinging arm of a mangle gear structure. The arbor 123 is driven by a shaft 124 through the medium of the helical gears 125 and 126. The opposite ends of the shaft 124 are mounted in bearings 127 and 128 at the opposite ends of the frame of the bill or note holding and supplying unit of the machine (Figs. 4ª to 6). The shaft 124 rotates continuously. The motion of the arbor 123 is transmitted by two equal gears 129 and 130 (Fig. 27) within the casing 122, previously referred to, to the mangle gear 121. The latter is provided with an axial stud 131 which projects into the guide grooves 132 of the frame or casing supporting the racks 118. The engagement by said stud with the said grooves maintains the gear 121 in engagement with the upper, lower and end portions of the rack 118. When the gear 121 is traveling over the horizontal parts of the rack 118 its motion and that of the carriage will be uniform with respect to the speed of rotation of the shaft 124. On reaching the curved portions of the rack at the opposite ends of the structure the movement of the said gear will be gradually retarded until it reaches the central point of the curves of said portions and from that point onward its movement will be gradually accelerated in the opposite direction, until it reaches either the upper or the lower horizontal portion of the rack 18, after which its movement will again become uniform.

*f. Mechanism for actuating the tappets of the collecting cylinders*

A flat cam bar 135 (Figs. 4ª to 6, 25 and 26) is located immediately below the lower roller guide 116 and immediately in front of the support 133 for said guide, the said cam bar 135 extending somewhat beyond the limit of the motion of the carriage 101. The said cam bar is capable of sliding a short distance in its bearings and it is mounted in parallel relation to the bar 102 upon which the carriage 101 travels back and forth. Upon the bar 135 cams 137 are arranged (Figs. 5 and 26), one cam being located adjacent to each collecting cylinder 22. These cams operate to raise or lower the rollers 138 which are mounted on the ends of levers 139, according as the cam bar 135 is moved toward the left or toward the right. Movement of the cam bar 135 is effected at the end of the movement of the carriage 101 toward the left by contact of a lug 136 (Fig. 26) upon the carriage with a lug or tappet 134 upon the said bar. Movement of the cam bar in the opposite direction at the end of the movement of the carriage toward the right, that is, at the end of a feeding movement thereof, is effected by contact of the said lug 136 with a similar lug or tappet upon the said bar at its opposite end. The levers or arms 139 are rigidly connected to shafts 140 which extend transversely of the structure. As a result of such rigid connection movement of the said levers, as heretofore described, effects oscillation of the said shafts 140. Such motion causes oscillatory movement of an arm or lever 139ª (Fig. 5) connected to the said shafts to the outer ends of which are connected the lower ends of links 141, the upper ends of which are connected to tappet lifts 142 (Figs. 10 and 12). One tappet lift and one set of links and operating arms are associated with each of the collecting cylinders 22. One end of each tappet lift is pivotally mounted upon or connected with a stud 143 (Figs. 10 and 15) on the back face 78 of the box 75ª. The free end of the said tappet lift is connected to the upper end of the connecting rod 141, as stated. The cam-like surfaces at the middles of the under side of the tappet lifts 142, when the latter are lowered, engage the tappets 35 and 36, as indicated in Fig. 10 of the drawings. The tappets are not shown in this figure in proper relation to the grippers, being displaced from their proper positions in order to show their relationship to the cams of the tappets.

*g. The driving mechanism for the collecting cylinders and the note collector or sweep*

It will be noted that the various mechanisms are driven from two shafts, one of which is the rear drive shaft 20 (Figs. 6 to 9 inclusive and 12) which operates the collecting cylinders 22 and allied parts, and the other the carriage drive shaft 124 (Figs. 4ª to 6, 8 and 9). Both of these shafts 20 and 124 derive their motion from a motion drive shaft 145 (Fig. 6). The latter is driven by a speed reduction gear mechanism at 146, the latter being driven by a suitable motor. The splined carriage shaft 124 is driven by the shaft 145 through the medium of bevel gears 147 and 148 (Figs. 6 and 9). The shaft 124 is rotated continuously. The shaft 20 is driven from the shaft 145 through gearing which is illustrated in Figs. 29 and 30. This shaft rotates intermittently. In the operation of the machine six complete revolutions of the shaft 20 are followed by a stop for an equal period of time. A gear 149 mounted upon the shaft 145 engages and drives a bevel gear 150 (Figs. 4ª and 6). The latter is connected to the gear train, including the gears 151, 152, 153 and 154 (see Figs. 29 to 30), all of which are loosely mounted, the first three on stationary studs and the last, 154, one the shaft 20 which operates to drive the bill or note collecting cylinders 22.

A short arbor 155 (Figs. 29, 30 and 31) is mounted upon the gear 154 near its rim. A star wheel 156 is secured to one end of the said arbor adjacent the outer face or side of the said gear. A short cylinder or turret 157 is mounted upon the opposite end of the arbor 155 in adjacent relation to the inner side or face of the gear 154. The said cylinder or turret is provided with slots 158 which extend across the inner face or end thereof remote from the inner face of the gear. A detent 159 is mounted on the gear 152 near its rim portion. This detent is adapted to engage the star wheel 156 when the centers of the star wheel and the detent fall together or simultaneously on the line of centers of the adjacent gears 152 and 154. It will be apparent that the gear 154 is driven by the idler gear 153, which in turn is driven by the gear 152. The numbers of the teeth of the respective gears 154 and 152 are so related to each other that the centers of the star wheel and the detent fall simultaneously in the line between the centers of the gears 152 and 154 once in every six revolutions of the gear 154. It will be seen, therefore, that the arbor 155 is rotated one step for each six revolutions of the gear 154. The number of slots 158 in the cylinder or turret 157 is half the number of the teeth in the star wheel 156. In the construction as shown, the star wheel is provided with eight teeth. It follows, therefore, that the cylinder or turret 157 is provided with four transverse slots 158. As a result of the relationship between the numbers of the teeth upon the star wheel and the slots 158 in the turret the solid material or projections between adjacent slots are moved alternately into the path of movement of a lug 161 (Figs. 29ª to 32) which is mounted upon a drum 161ª secured to the cylinder drive shaft 20. As already stated, the gear 154 rotates continuously. If it happens that the cylinder or turret 157 is in such position that one of the slots therein is in registry with the lug 161 the said gear 154 will make six revolutions without causing or effecting rotation of the shaft 20. At the completion of the said six revolutions the cylinder is caused to move forward a step, as already described, so as to bring a solid portion thereof intermediate adjacent slots into registry with the lug 161, whereupon during the next six revolutions of the gear 154 the shaft 20 will be driven. In order to avoid overrunning of the arbor 155 and the star wheel and cylinder or turret mounted thereon the latter is provided with shallow grooves 162 (Figs. 30 and 31) which are adapted to be engaged by the end of a spring 163.

*h. The vacuum controlling mechanism for the suction rollers*

I shall now proceed with a description of the means for creating and controlling a vacuum or partial vacuum in the suction rollers 12. This mechanism includes a control valve intermediate the vacuum producing means and the chambers within the rollers for controlling the action of the said vacuum producing means upon the latter. Without some such controlling means a bill or note would or might be withdrawn or extracted from the stack of bills associated with a vacuum roller at each revolution thereof. The controlling means must, therefore, operate to provide a vacuum within a suction roller at a time or period when a bill or note is to be withdrawn and to effect communication of the interior of such roller with the atmosphere when it is not desired to withdraw or extract a bill or note. The valve for controlling the creation of a vacuum intermittently in a vacuum roller is indicated at 96 (Figs. 7, 8 and 9) and is shown in detail in Figs. 33, 34 and 38 of the drawings. The said valve is of the general form of the usual type of rotary plug valve. Three outlets are provided. Two of these, 164 and 165, are placed radially of the body 166 of the valve 90° apart. The third outlet 167 is placed axially of the plug valve or valve element 168. The upper outlet 164 is open to the air and terminates at the valve seat 169. The outlet 165 communicates with an annular space 170 and is connected to the vacuum producing means. The valve plug 168 is hollow and is closed at one end, from which a stem 171 extends. The opposite end is open and is in communication with a pipe 95, the end of which is secured in an opening 167 in the valve casing. A radial opening 172 in the valve plug 168 is adapted to register with the opening 164 through the valve seat 16ᵇ. In the position as shown in Fig. 38 the interior of the valve plug 168 is open to the air, in consequence of which air is free to enter the pipe line 95 which is in communication with the interior of a vacuum or suction roller 12 (Fig. 12). When the plug 168 is turned so as to bring the opening 172 into position to communicate with the annular space 170 between the said plug and the casing the outlet 164 to the atmosphere is closed. At this time the interior of the plug is in communication with the vacuum producing means whereby a vacuum may be produced in the vacuum roller 12 with which the associated pipe 95 is in communication.

In the operation of the machine it will be understood that bills or notes are withdrawn or extracted from the holders therefor during the revolution of a collecting cylinder 22 only when a vacuum is established in the associated suction roller 12. It is necessary, therefore, to provide means for so controlling the operation of the valve plug 168 as to create a vacuum in a roller only at such times as it may be desired to withdraw or extract a bill or note from the bill or note holder associated therewith. The mechanism for that purpose is illustrated in Figs. 33 to 38 inclusive and comprises a casing 97, the opposite ends of which are adapted to be closed by means of removable cover or closing plates 173 and 174. An arbor 175 is supported in bearings provided in the plates 173 and 174, which arbor is in alinement with the valve stem 171 of the immediate controlling valve structure 96. The said valve structure is supported upon a bracket 96ª secured to the side 174 of the casing. The arbor 175 is connected with the valve stem 171 by means of an Oldham coupling 171ª. Mounted upon the arbor 175 is a mutilated gear 176 which has a long hub offset 177 which extends to the left upon the said arbor, as indicated in Fig. 33 of the drawings, and a short hub offset 181 extending in the opposite direction. The gear 176 is keyed to the arbor 175 by a key 177ª. The long hub offset is provided with flanges at its opposite ends. In other words, the said hub offset is of spool shape. A pin 178 extends through and is supported by these flanges. A spiral spring 179 is secured at its inner end to the said pin. The outer end of said spring is secured to a pin 180 mounted in lugs upon the front side or face of the casing 97. The spring 179 tends to produce rotation of the gear 176 to the left, having reference to Fig. 35 of the drawings. A ratchet wheel 182 (Figs. 33 and 37) is secured to the short hub offset 181. The teeth of the said ratchet wheel are pointed or inclined in a direction to prevent rotation of the mutilated gear 176 toward the left. A pawl 183 engages the said ratchet wheel. This pawl is pivotally mounted upon the left face of an adjacent scape wheel 184 which is loosely mounted on the arbor 175. A second ratchet wheel 185 is secured or fastened to the opposite or right side of the scape wheel 184. The latter ratchet wheel is provided with teeth which are inclined in a direction opposite to that in which the teeth upon the first indicated ratchet wheel are inclined. A pawl 186 mounted upon a stationary pivot projecting inwardly from the cover plate 173 engages the teeth of the ratchet wheel 185. I have thus provided two rotating elements mounted upon the arbor 175, namely, the gear 176 and the ratchet wheel 182, and the scape wheel 184 with its ratchet wheel 185. The gear 176 and the ratchet wheel 182 are secured to the arbor 175 and rotate therewith to effect rotation of the valve plug 168 which is connected to the said arbor in the manner as heretofore described. The scape wheel 184 is loosely mounted upon the arbor 175, so that it, together with the ratchet wheel 185 mounted thereon, is rotatable independently of the mutilated gear 176 and the parts mentioned as being connected and rotatable therewith. The teeth of the scape wheel 184 are pointed in a direction to oppose or prevent left hand rotation. These teeth are adapted to be engaged by a pallet or detent 187. The said detent is mounted on a longitudinally slidable spindle 188 which is fitted in a long bearing 189. Rotation of the said spindle 188 is prevented by a key 190. The spindle 188 projects into a solenoid 191 which, when energized, causes movement of the same to the left. A retraction spring 192 is employed for moving the said spindle in the opposite direction to return it to its original position. The scape wheel 184 is provided with two sets of teeth mounted in staggered relation with respect to each other and in spaced vertical planes. These planes extend at right angles to the arbor 175. There are six teeth in each set. When the slidable spindle 188 is drawn or moved to the left by the action of the solenoid the detent 187 is likewise moved to the left, so that a tooth on the right hand side of the scape wheel 184 which may have been in contact with the said detent is released to permit left hand rotation of the said scape wheel. Rotation of the said wheel is effected by the engagement of the teeth of the ratchet wheel 182 with the pawl 183 which is pivotally mounted upon the left hand side of the scape wheel (looking at Fig. 33) and held in engagement with the said teeth by a spring 184ᵃ. Upon the de-energization of the solenoid the slidable shaft under the influence of the spring 192 returns to its original position, so that a tooth in the left hand set of teeth upon the scape wheel is released and the said wheel continues its rotation until the next tooth in the right hand set of teeth thereon contacts with the said detent. It will be seen that as a result of a complete back and forth movement of the slidable spindle 188 the scape wheel is permitted to move through one-sixth of a complete revolution.

The casing 97 with the control mechanism therein is mounted on the rear side of the base 1 of the bill or note holding and feeding mechanism underneath the drive shaft 20 (see Fig. 7). Upon the shaft 20 (Figs. 33 and 35) a gear segment 193 is mounted which is adapted to engage with the mutilated gear 176. The length of the arc of the gear 176 from which the teeth are omitted is slightly greater than one-sixth of the circumference of the said gear. Within the said arc the gear segment 193 may revolve while out of engagement with the gear. At such time the movement of the said segment will have no effect upon the gear. When the toothed portion of the gear 176 is in position to be engaged by the teeth upon the gear segment 193 rotation of the shaft 20 toward the left causes rotation of the gear 176 to the right a distance corresponding to the number of teeth in the segment. The numbers of the teeth upon the segment and the gear are so chosen that one rotation of the segment causes a rotation of the gear through one-sixth of a revolution. Assuming that the gear is in position for the tooth 194 at the left extremity of the toothless arc, previously referred to, to engage the segment, five revolutions of the segment will bring the gear in the position shown in which the toothless space of the gear 176 is presented to the segment 193. When in this position further rotation of the segment will have no effect upon the gear until the latter shall have been rotated to position the teeth thereon to be engaged by the teeth of the segment. In the position of the gears as shown in Fig. 35 the vacuum control valve plug 168 is in position to permit air to enter the vacuum or suction rollers 12. At such time no bills or notes will be drawn or extracted from an associated bill holder.

The solenoid 191 (Figs. 33 and 35) is adapted to be energized during the period of rest of the drive shaft 20, that is, during the period that the bill collecting cylinders 22 are at rest. At such time the gear segments 193 on the said shaft 20 are so positioned that they are entirely clear of the gears 176, as is shown in Fig. 35. If during this period the solenoid should be energized three different times due to the passage of an envelope through the envelope feeding and filling unit of the machine, the gear being under the tension of the spring 179, (bearing in mind that each impulse of the solenoid produces one-sixth of a revolution of the gear 176) the radial opening 172 in the valve plug 169 will be moved to a position diametrically opposite to that in which it is shown in Fig. 33, so that vacuums will be established in the vacuum or suction rollers 12. With the control mechanism so positioned when the drive shaft 20 resumes its rotation to the left a bill or note is drawn or extracted at the beginning of the first revolution. Upon rotation of the shaft 20 the segment 193 engages the teeth of the gear 176 which have been moved into its path and effects a right hand rotation thereof equivalent to the left hand rotation previously effected by the action of one energization or impulse of the solenoid 191. The relation of the teeth of the ratchet wheel 182 to the pawl 183 is such as to permit rotation of the gear in the direction as stated, but the scape wheel 184 is held against rotation at such time by reason of the engagement of the pawl 186 with the ratchet wheel 185. During the next revolution of the shaft 20 and the gear segments 193 carried thereby the operation is repeated and the gear 176 is again rotated to the same extent. At the end of the third revolution of the drive shaft 20 the gear 176 has assumed its original position in which the toothless space thereof is presented to the segment 193. In that position air again enters the suction rollers 12 and in the succeeding predetermined number of revolutions of the shaft 20 there is no further withdrawal or extraction of bills or notes from the bill or note holders. In fact, no bills or notes are withdrawn until the operations as previously described are repeated, due to the passage of a punched envelope through the envelope feeding and filling unit of the machine. The numbers of the teeth in the gear 176 and in the segment 193 provide for five energizations or impulses of the solenoid for withdrawing or extracting the maximum number of five notes for each setting of the control mechanism. The bills or notes extracted or withdrawn from the holders as just described are delivered to the collecting cylinders 22 from which they are removed and conveyed between the guides 72 and 73 (Figs. 1 and 5) to the extreme right hand end thereof, as previously described. The folded bills or notes in their final position at the right hand end of the guides 72 and 73 extend across the space between the guides 74 and 75. In this position they are adapted to be engaged by a plunger or blade 309 of arc-shape which is adapted to be moved back and forth between the said guides 74 and 75.

The guides 74 and 75, as already stated, terminate in adjacent relation to the pocket 202 (Figs. 1, 39, 41, 44 and 46).

2. THE ENVELOPE FILLING MECHANISM

The mechanism of the envelope filling means is mounted on and within a box-like frame 201 (Figs. 43 to 47) open at its top and bottom. The arrangement of the elements of this mechanism follows quite closely that indicated in the diagrammatic view as shown in Fig. 2 of the drawings. The pocket 202 which receives folded notes or bills from the bill or note collecting mechanism is situated near the middle of the frame 201. The lower, middle and upper envelope blades 203, 204 and 205 upon which the envelopes are adapted to be thrust are connected at their left ends to the interior, lower and upper faces of a filling box 206 at the points 207 and 208 (see Fig. 44). One edge of each of the top and bottom plates of the filling box 206 is secured or attached to the stub end 209 of a short arbor 210 which is mounted on the front upper flange of the frame 201. The axis of the arbor 210 is in alinement with a central plane between the upper ends of the guides 74 and 75 (Fig. 46) which enter the frame 201 from the opposite side thereof and register with the opening in the bill or note pocket 202 between the lower and middle envelope blades 203 and 204. A gear segment 212 is connected with the arbor 210 (Figs. 39 and 40) at a point outside the bearing 211 (Fig. 45) by which the said arbor is supported. A driving gear segment 213 pivoted on a stud 214 upon the frame engages the gear segment 212. A left hand angular or rotary movement of the driving gear segment 213 operates to turn the filling box 206 from the horizontal position shown in Fig. 39 of the drawings into a vertical position. This movement of the driving segment 213 is effected by the action of a cam 215 mounted within the frame 201 (Figs. 39, 41, 44 and 46). The said cam is mounted on a shaft 216 and acts upon a roller 217 mounted upon the outer end of an arm or level 218 (Fig. 41). The said arm or lever is connected with an arbor 219, one end of which extends through a side of the frame 201. To the projecting end a lever or arm 220 (Figs. 39 and 41) is connected, the upper free end of which is connected by means of a link 221 to the driving gear segment 213. Contact of the roller 217 with the cam 215 is maintained by the action of a spring 222, one end of which is attached to the lower extremity of an extension from the lever 218.

3. THE ENVELOPE FEEDING MECHANISM

*a. The envelope magazine*

The holder 224 (Figs. 4ª, 39, 40 and 42) in which the envelopes are held is positioned at the extreme right hand end of the frame 201. It is so positioned that the envelopes are held in alinement with the blade, 203, 204 and 205 upon which they are adapted to be thrust, as heretofore described. The bottom plate 226 of the holder extends only half way across the bottom of the bin leaving the remaining half portion thereof open (Fig. 39). The envelopes are supported upon the plate 226 and their forward ends project therefrom over the unclosed or open space. The bottom plate 226 is located in a plane slightly above that of the guide 227 along and over which the envelopes move in their passage forward through the machine to the envelope blades. The guide 227 consists of a thin metal sheet, the upper surface of which is level or in the same plane as the tops of the friction feed rollers 239 and 240 (Figs. 39 and 49) and extends from the holder 224 to a point near the blades 203 and 204 (Figs. 1, 39, 40, 44 and 45). Guide flanges 228 and 230 (Figs. 40 and 45) are located upon opposite sides of the supporting guide plate 227. The lateral guide flanges 228 and 230 are secured to the vertical members of the feed roller yokes 245 and 247. The inner side of the envelope holder 224 is open, except for the presence of a narrow strip 225 (Fig. 42) extending from the top to a point slightly above the bottom and which is located substantially midway between the opposite sides thereof.

b. *The envelope conveyor mechanism and the driving means therefor*

Immediately underneath the open space at the bottom of the bin (Figs. 39, 40 and 49) a friction roller 231 is mounted, its opposite ends being supported on bearings located at the opposite sides of the frame 201. The friction surface of the said roller 231 is tangent to the plane of the upper surface of the bottom plate 226 and supports the front part of the envelopes which extend over the open half portion of the bottom of the holder. A pinion 232 is secured to the arbor or trunnion at the rear side of the frame 201. An intermittent or mutilated gear 233 is mounted on the rear end of an arbor or shaft 234 and is adapted to engage the friction roller pinion 232. A similar intermittent or interrupted gear 236 is mounted upon the front end of the arbor 234. The gear 236 is provided with a greater number of teeth than is the case with the gear 233. The intermittent gear 236 engages a pinion 238 which drives the feed roller 239. The two intermittent gears 233 and 236 are so positioned in their angular relation to each other that as the teeth of the first pass out of engagement with the friction roller pinion 232 the teeth of the second go into engagement with the feed roller pinion 238. The adjacent feed roller 240 is provided with a pinion 241 upon the arbor at its front end which is in engagement with an idler gear 242 which is also in engagement with the gear 238 and driven thereby. The idler gear 242 is mounted between the two gears 238 and 241 upon a stationary stud which is supported upon the inverted U-shaped yoke 245 (Figs. 39 and 52) the lower ends of the opposite legs of which are fastened to the top of the frame 201. Two follower rollers 244 and 246 (Figs. 39 and 49) are supported by a relatively narrow plate spring 248 above the feed rollers 239 and 240. The said rollers are mounted in bearings provided in projections or lugs 249 and 250 which depend from the opposite ends of the spring 248. The arbors 251 and 252 upon which the rollers are mounted rotate within the bearings in the lugs 249 and 250. The rollers 244 and 246 are adapted to frictionally engage the rollers 239 and 240 and to hold the envelopes which pass through the envelope feeding unit of the machine in contact therewith, that is, with the rollers 239 and 240. An intermediate or second feed mechanism is provided comprising feed rollers 239ª and 240ª (Figs. 39 and 40) similar to the feed rollers 239 and 240. The said intermediate or second feed mechanism is similar in all respects to the feed mechanism comprising the feed rollers 239 and 240. The said second feed mechanism comprises a U-shaped yoke member 245ª identical in form and construction with the yoke 245. A third feed mechanism is shown (Figs. 39, 40, 44 and 45) which is located in proximity or near relation to the filling box 206, previously referred to. The said third feed mechanism comprises rollers 253 and 254 mounted in a manner similar to that in which the feed rollers previously referred to in connection with the first and second feed mechanisms are mounted. Follower rollers corresponding to the follower rollers previously described are provided in the said third feed mechanism for cooperating with the feed rollers 253 and 254. The arbors at the front ends of the rollers 253 and 254 are provided with gears 255 and 256 between which is located an idler gear 257 with which each of the said gears is in engagement.

The roller 253 is mounted on an arbor 266 (Figs. 39 and 40) upon the front end of which the gear 255 is mounted. Upon the rear end of the said arbor a pinion 265 is mounted, which pinion is in engagement with a gear 264 mounted upon a cross shaft 263. A bevel gear 262 is also mounted upon the said cross shaft, which bevel gear is in engagement with a bevel pinion 261 (Figs. 40 and 41) mounted upon the upper end of a vertical shaft 258. A worm wheel 260 is mounted upon the lower end of the vertical shaft 258, which worm wheel is in engagement with a driving worm 259 (Fig. 4ª) of unusually large diameter which is mounted upon the main drive shaft 145. It will be seen, therefore, that upon the driving of the arbor 266 in the manner as described the train of gears 255, 256 and 257 are driven and thereby effect rotation of the rollers 253 and 254.

A sprocket wheel 267 is mounted on the shaft 263 (Figs. 39 and 41) within the opposite sides of the frame 201. A similar sprocket wheel 268 is mounted upon a shaft 235. The sprocket wheel 268 is driven from the sprocket wheel 267 by means of a sprocket chain 267a. The driving of the latter sprocket wheel effects rotation of an intermittent gear 268a mounted upon the said shaft 235. The said intermittent gear is adapted to engage a gear upon the arbor of the feed roller 239a and to drive the same in the same manner as the intermittent gear 236 drives the feed roller 239. Another pair of sprocket wheels (similar to the sprocket wheels 267 and 268) are mounted upon the shafts 235 and 234. The sprocket wheel on the shaft 235 is indicated at 235a in Fig. 41. The sprocket wheel upon the latter shaft is driven by means of a sprocket chain 267b to effect rotation of the shaft 234, together with the intermittent gears mounted upon the opposite ends thereof.

4. THE ENVELOPE DELIVERY MECHANISM

When the filling box 206 occupies a vertical position (Figs. 1 and 39) the envelopes assume a position in line with the vertical guides 269 and 270. The respective couples of guides are spaced from each other to form grooves into which the opposite edge portions of the envelopes are guided or inserted as they are forced downward from the envelope blades 203, 204 and 205, previously referred to, by means of a vertical acting plunger 284 (Figs. 39 and 41). The envelopes after their removal from the said blades rest in an upright or vertical position upon a horizontal delivery guide 279 (Figs. 39, 40, 42 and 44). A horizontally acting plunger 273 is adapted to cause movement of the said envelopes along the said delivery guide. The said plunger is supported upon the lower ends of two pairs of parallel depending arms 274 and 275 which are pivoted at their upper ends to arbors 274a and 275a which extend across the frame of the envelope feeding unit of the machine (Fig. 46). One pair of the arms 275 is connected to the end of a link 275b, the opposite end of which is connected to the upper end of an oscillatable arm or lever 276 (see Fig. 44). Oscillation of the said lever is effected by means of a cam 277 which acts upon a roller 278 mounted at the middle portion of the said oscillatable arm or lever 276. Oscillations of the arm or lever 276 effect through the connections described reciprocating movements of the plunger 273 from a plane to the left of the vertical guides 269, 270, etc., previously referred to, to a plane to the right of the said guides. The horizontal delivery guide 279 extends from a point in front of the guides 269, 270, etc., to a point beyond the rear end of the machine. Located upon the opposite sides of the said horizontal delivery guide are guide flanges 280, 281, 282 and 283 (Figs. 39, 42 and 44) which retain the envelopes upon the guide 279.

The vertical plunger 284 (Figs. 39 and 41) is mounted at the lower end of a plunger rod 294. The stroke of the said plunger in its operation of removing the envelopes from off the blades 203, 204 and 205 is of considerable length and the said stroke must be precisely timed. To effect reciprocations of the plunger a cam 285 mounted on arbor 216 and a vibrating arm or lever 286 are employed (Figs. 39, 40, 41 and 45). The cam 285 causes oscillations or vibrations of the arm or lever 286. The motions or vibrations of the said arm or lever are caused to effect reciprocations of the plunger 284 by means of a cable and multiplying sheaves. One set 287 of these sheaves is mounted upon the end of the lever 286 (Figs. 39 and 41), while the other set thereof 288 (Figs. 39 and 44) is mounted upon the stud fixed to one side of the frame 201 of the machine. A cable 289 extends around the said sheaves. One end of the said cable is attached to the frame as indicated in Fig. 39 from which point of attachment the said cable is carried around the sheaves of the two sets of sheaves 287 and 288 and then upwardly and over guiding sheaves 290 and 291 to a sliding member 292 to which it is attached by means of a lug 293. The upper end of the plunger rod 294 is secured to the slidable member 292. The said plunger rod is in alinement with the axis of the note pocket 202 within the box 206 when the latter occupies a vertical position (Fig. 39). The sliding member 292 is mounted upon and guided by a vertical bar 295. A guide 296 is mounted upon the lower end of the said bar 295 for guiding the plunger rod 296. The upper end of the vertical guide bar 295 is secured to a tie-plate 301 which is mounted upon the upper ends of four vertical columns 297, 298, 299 and 300. The lower end of the bar 295 is connected with a cross brace 302 which is secured to the columns 298 and 299. The cable 289 is extended from the lug 293, previously referred to, and passes over a guiding sheave 303 mounted upon the tie-plate 301. The extended end of the said cable is secured or fastened to the upper end of a coiled retraction spring 304, the lower end of which is secured or fastened to the cross brace 302.

5. THE DRIVE FOR THE ENVELOPE FILLING AND DELIVERY MECHANISMS

The filling box cam 215, the delivery plunger cam 277 and the vertical plunger cam 285 are all mounted upon and rigidly secured or fastened to a single shaft 216 (Figs. 45 and 46) which extends across the frame. This shaft is driven by a bevel gear 304ᵃ mounted upon the rear or inner end of the said shaft upon the outside of the inner or rear side of the frame 201. The bevel gear 304ᵃ is in engagement with a bevel pinion 305 secured upon the forward end of a horizontal shaft 306 (Figs. 4ᵃ, 39, 40 and 41), the rear end of which is provided with a bevel gear 307 which is in engagement with a corresponding bevel gear 308 upon the shaft 258 (Fig. 39).

6. THE MECHANISM FOR TRANSFERRING THE BILLS OR NOTES FROM THE COLLECTING UNIT TO THE ENVELOPE FILLING MECHANISM

For the purpose of transferring the once folded bills or notes from between the guides 72 and 73 through the guides 74 and 75 into the pocket 202 I have provided a flexible transfer blade 309 which is adapted to operate between the guides 74 and 75 (Figs. 1 and 5 to 9). The said blade is of arc-shape and is in the form of a thin plate, as shown. The upper end of the said blade is free, while the lower end thereof is connected by means of a pin to the outer swinging end of an oscillatory arm 310. The said arm extends through and operates within a slot (not shown) in the guide plate 75. The said slot is located midway between the opposite edges of the said guide plate and extends longitudinally thereof. The oscillatory arm 310 operates through an angle of about 150°. The said arm is rigidly fastened to a shaft 311 (Figs. 41 and 43) located at the rear side of the frame. The said shaft extends from a point near the front end of the frame to a point toward the middle of the envelope filling unit of the machine. The arm 310 is mounted adjacent its rear end. Oscillation or vibration of the shaft 311 is effected by means of a vertical cylindrical cam member 312 (Figs. 39 and 43) which engages a roller 313 mounted upon the arm of the gear segment 314. Rotation of the cam 312 causes vibration of the gear segment 314. The latter is in engagement with a gear segment 315 which is fast on the shaft 311. It is apparent, therefore, that vibration of the gear segment 314 actuates the gear segment 315 which in turn causes vibration of the shaft 311 together with the arm 310 thereon upon the outer end of which the transfer blade is mounted. The vertical cylindrical cam member 312 is provided with a helical gear 316 (Figs. 4ᵃ, 39, and 43) with which an idler helical gear 318 is in engagement. The latter gear is in engagement with a helical gear 317 (Figs. 4ᵃ, 39 and 46) which is secured to the cam supporting shaft 216, previously referred to. The driving of the latter drives the idler helical gear 318, while the latter drives the helical gear 316 mounted upon the cylindrical cam member 312.

7. THE COIN DELIVERY MECHANISM

*a. The coin magazine*

The coin carrying and delivery mechanism 319 (Figs. 39, 41 and 54 to 57) is mounted upon the columns 297 and 298, above referred to. The said mechanism is located in proximity to the filling box 206. The coins are stacked in a series of vertically positioned coin carrying tubes 320 which are fastened to the top cover 324. Between the top cover 324 and a flange 325 of the hopper into which the released coins fall flat plates 327 and 328 are located. The lower plate 328 is provided with openings which are located under each coin holding tube. One of these openings is indicated at 329 in Fig. 54 of the drawings. These openings have parallel sides which are located at equal distances upon opposite sides of the axes of the coin carrying tubes 320. One end of each of the openings is V-shaped, as indicated at 330 (Fig. 54). The apex of the V-shaped portions of each opening is located near the center of the coin carrying tube with which it may be associated. As a result of this construction the stack of coins is supported upon the portions of the plate 328 on opposite sides of the V-shaped openings 330.

Coin trip blades 332 which are of a thickness less than that of the coins which they control slide in grooves 333 and 334 in the top of the plate 328. The top surfaces of these blades are flush with the top of the said plate. The said blades are in alinement with the openings 329. The inner ends of the said blades are also of V-shape, as indicated at 335, and the surfaces of the sides of the V-shaped portions thereof occupy positions normally in tangential relation to the circumference of the stacked coins 331. The upper plate 327 which is provided with circular openings 336 which register with the vertical coin carriers 320 forms an upper bearing for the coin trip blades 332 and retains them in the grooves 333 and 334. When a coin trip blade 332 is pushed forward until its V-shaped end registers vertically with the V-shaped end of the orifice or opening 329 in the plate 328 the coin 331 with which the said coin trip blade was in contact is moved forward off of the supporting edge portions upon opposite sides of the V-shaped portions of the openings 329 and falls through the said opening. The extent of movement required to effect such discharge of a coin is equal to the distance between the peaks of the V-shaped portions of the openings 329 and the inner ends of the coins trip blades 332.

*b. The electrical controlling means for releasing the coins*

Tripping movements of the coin trip blades 332 are effected by solenoids 337 (Figs.

39, 53, 55 and 56) which are mounted upon the hopper 326. The solenoid plungers 338 are guided horizontally in bearings within the cores of the solenoids. These plungers are connected at their outer ends to floating levers 339, the lower ends of which are connected to the outer ends of links 339ª, the inner ends of which are connected to lugs mounted upon the hopper 326. The upper ends of the said floating levers 339 are connected to the outer ends of links 341, the inner ends of which are connected to members 340 which are secured to the outer ends of the coin tripping blades 332. Also connected to the outer ends of the said blades and to the said members 340 are plates having depending portions 343ª, the lower ends of which are provided with notches which extend over stationary outwardly extending bolts 343. The said depending portions 343ª are located inside of washers 342ᵇ mounted upon the said bolts 343. Coiled springs 342 are mounted upon the said bolts. Each spring bears at one end against the associated depending portion 343ª, while the opposite end of said spring bears against a shoulder upon said bolt. When a floating lever 339 is actuated to cause inward movement of a coin tripping blade 332 when an associated solenoid is energized, the associated coiled spring 342 is compressed. Upon de-energization of the said solenoid the spring 342 expands so as to return the coin tripping blade 332 to its outermost position.

When a coin is tripped by a coin tripping blade 332 it falls through an orifice 329 upon a coin release table 344 (Fig. 56). This table extends throughout the length of the hopper 326, transversely thereof. The inner edge of said table is secured to an arbor 345 which is adapted to be oscillated to cause oscillation or angular motion of the said table 344. The arbor 345 is provided with a laterally extending arm 346 (Figs. 53 and 55), the outer end of which is connected with the upper end of a link 348, the lower end of which is connected to the end of an arm 347 which extends inwardly from an arbor 347ª. The upper end of a rod 348ª is connected to the outer end of an arm 348ᵇ connected to the said arbor and extending outwardly therefrom. The outer end of the arm 348ᵇ and the said rod 348ª are normally held in their uppermost positions by means of a coiled spring 347ᵇ. Normally the table 344 occupies its uppermost or nonreleasing position. The lower end of the connecting link 348ª is connected to one end of a horizontally extending lever 349 (Fig. 39), the opposite end of which is pivotally connected to a stationary stud or other support. The said lever is provided at about its middle point with a roller 350 which is adapted to contact with a rotating cam 351 mounted on shaft 263 to which reference has been previously made. The said roller is held in contact with the said cam by the action of the spring 347ᵇ, previously referred to.

An electric contact system is located or mounted within or underneath the yoke 245 (Figs. 39 and 49), which system is adapted to energize and de-energize the electro-magnets associated with the note release mechanism (Fig. 33). Such energization and de-energization causes reciprocating movements of the solenoids associated with the said electro-magnets. A similar electric contact system is mounted or located within or underneath the yoke 245ª which operates to control, in a similar manner, the coin release mechanism. Both systems are controlled by the passage of envelopes through the envelope feeding unit, such control taking place when the envelopes are in proper position with relation to the contacts of the respective systems.

8. THE ELECTRIC CONTACT SYSTEM FOR CONTROLLING THE BILL FEEDING MECHANISM

I shall now proceed with a description in detail of the electric contact system for controlling the electro-magnets which are associated with the bill or note feeding mechanism.

The five electrical contact points 353 to 357 which control the circuits that energize the solenoids of the note or bill control mechanism are mounted between the feed rollers 239 and 240 (see Fig. 51). They are spaced laterally in a horizontal plane to correspond to the spacing between the holes in the envelopes, as shown in Fig. 4. The contact points 353 to 357 are arranged in two different lines and those in one line are located in staggered relation to those in the other line to permit the use of contact carrying blades of adequate width within the restricted space available. The plan of the upper contact points and their supporting blades is shown in Fig. 51, wherein the points 353, 354, 355, 356 and 357 correspond to the twenty, ten, five, two and one dollar lines of openings in the envelopes. (See Fig. 4.) Contact studs are mounted at the free ends of spring blades 358 and 359 (Figs. 49, 51 and 52), the other ends of which are fastened to a supporting plate 360 of insulating material. The said supporting plate is located above and in symmetrical relation with respect to the center line of the envelope supporting and guide plate 227. The supporting plate 360 is secured to the portions of narrow band-like members 361 (Fig. 52) which are attached to the envelope guides 228 and 230 located upon opposite sides of the guide plate 227. The upper contact points cooperate with a similar set of lower contact points of which 363 and 364 are shown in elevation in Fig. 49. The lower contact points protrude slightly through openings in the envelope support and guide 227. The lower contact points are mounted on a plate 366 of conducting material which constitutes a ground for the circuits controlled by the said contacts.

A narrow spring plate blade 367 (Figs. 49, 51 and 52) is located below the plate 366 and extends along the central line of the envelope guide. The end of the said blade which projects or points toward the rear end of the machine toward the envelope holder is bent over, as shown in Fig. 49 of the drawings. A contact point 368 is secured to the said blade near its rear end underneath the bent over portion thereof. A cam lug 369 of U-shape is mounted upon the bent over portion of the said blade. The rear edges of the opposite sides or legs of the U-shaped lug are curved, as indicated, to form cam surfaces. A cam lug 370 (Fig. 49) projects downwardly from the plate 360 and extends in between and slightly below the plane of the tops of the opposite edges of the sides of the said lug 369. A contact point 371 (Figs. 49 and 50) is supported in registry with and immediately below the contact 368. The said contact 371 is supported upon a cross strip 371ᵃ (Fig. 50) which in turn is supported at its opposite ends by narrow plate blades 372 and 372ᵃ which are secured to the left hand end (having reference to Fig. 52) of an insulating block 374.

A U-shaped lug 376, of a construction similar to the lug 369, and located to the left of the latter and also to the left of the contact 353 (having reference to Figs. 49–52) is mounted upon a relatively narrow spring blade 373. The upper ends of the opposing legs of the said U-shaped lug 376 are located upon the opposite sides of a stationary cam lug 377 (Fig. 49). The spring blade 373 which carries the cam lug 376 is attached to the center of the cross strip 371ᵃ (Fig. 50). A contact point 378 (Fig. 49) is mounted upon the free end of the blade 373 and registers with a contact point 379 which is mounted upon the free end of a spring 380 supported at its opposite end at 381 in contact with a strip which constitutes a common ground to which one terminal of each of the solenoids 191 (Figs. 33 and 35) is connected. Normally the contact points 353, 363, and 354, 364 are in contact, but at such time no current passes because of the gaps between the contacts 368 and 371, and 378 and 379. When an envelope in passing between the feed rollers 239 and 244 strikes the two overlapping cam lugs 369 and 370 the contact point 368 is depressed into contact with the contact point 371. As the envelope proceeds it is forced between the contacts 354 and 364, and 353 and 363. A further movement depresses the contact member 378 into contact with the contact member 379 by the action of the cam lugs 376 and 377. As the envelope continues its movement the holes therein come into registry with the contacts 353 and 354 and current through the circuits including the said contacts is allowed to flow. As the trailing end of the envelope passes or leaves the cam lug 369 the current through the circuit controlled by the contact point 368 is broken. When the trailing or rear end of the envelope has passed beyond the cam lug 376 the contact point 378 is allowed to rise to open the circuit controlled thereby. The object of the double break in the circuit is to keep the circuit open at all times when an envelope is not in position between the contacts 353 and 363, and 354 and 364. Were only the entering circuit break provided the release mechanism would be tripped before the arrival of the envelope under the contact points 353 and 354.

9. THE ELECTRIC CONTACT SYSTEM FOR CONTROLLING THE COIN RELEASE MECHANISM

The coin delivery solenoids 337 (Figs. 39, 53, 55 and 56) are operated by a similar mechanism to that just described but which is not shown. The mechanism for operating the coin delivery solenoids is located between the second pair of rollers 239ᵃ and 240ᵃ (Figs. 39 and 40). The mechanism for controlling the coin delivery solenoids differs from the bill or note delivery mechanism only in that the contacts are arranged on the opposite side of the longitudinal center line of the upper contact support 360 to correspond to the arrangement of the holes of the envelope (Fig. 4) which control the delivery of coins.

OPERATION

The functioning of the component elements of the machine in carrying out the operation as hereinbefore described may now be considered. As has been indicated, all of the component parts of the machine are driven directly or indirectly by or from the main drive shaft 145 (Fig. 4ᵃ). The movement, therefore, of every component element or part of the machine bears a definite relation to the rotation of the said drive shaft. This mutual relationship may be employed to illustrate or show diagrammatically the positions of the moving parts at any moment. One way of constructing such a diagram is to plot the movements of the several and separate parts of the machine from as many different bases as there are parts, against or with relation to one of them. The cam shaft 216 shown in Fig. 39 may be taken as a convenient base, as it rotates once for a full cycle of the movements of the parts in both units of the machine. In Fig. 58 I have shown such a diagram comprising different sections or parts $a$, $b$, $c$, $d$, $e$, $f$, $g$, $h$ and $k$. These constitute or form nine diagrams. The vertical dimensions of the said diagrams represent the movements of the separate parts and the horizontal dimensions thereof represent the degrees of rotation of the cam shaft 216. Taking the zero point of the rotation of the cam shaft 216 as corresponding with the extreme backward position of the carriage 101 (Figs. 4ᵃ to 6) the collecting cylinders 22 will remain stationary in the position indicated in diagram *b* of Fig. 58 during the rotation of the cam shaft 216 through an angle of 180°. During the movement of the said cam shaft through the first 10° of its rotation the carriage remains stationary. During the next 160° of rotation the carriage 101 carries the sweep or plunger through the guides 72 and 73 and the slots in the cylinders 22 (Figs. 1 and 5) and during such time or period the said plunger completes its forward stroke. Upon the completion of its forward stroke it remains stationary during the following period while the cam shaft 216 is moving through an additional 20° of rotation. Thereafter the operation of the carriage and the sweep or plunger carried thereby is repeated, but in reverse order or direction, until the carriage returns to its initial extreme backward position. At the zero position of the cam shaft 216 assumed as above the box 206 occupies a position of inclination of about 50° (see diagram *d* of Fig. 58). During the initial period of rotation of the cam shaft through an angle of 25° the filling box is rotated through a further angle of 40°, so that it occupies a horizontal position, which position it maintains until the cam shaft has rotated through a 155° angle. When the cam shaft shall have completed rotation through a 200° angle the filling box will have been returned to a vertical position. In the same manner the position of any other element may be compared with the angular position of the cam shaft 303, and also the positions of the elements may be compared with respect to each other.

The movements of a bill and the envelope into which it is to be inserted and the movements of the component mechanisms which effect their transfer will now be traced by comparison with the rotation of the cam shaft 216. For this purpose reference may be made to diagram *b* of Fig. 58 in which the motions of sections *a* and *c* to *k* inclusive of Fig. 58 are traced during or over three revolutions of the cam shaft 216. In the first outward or forward stroke of the carriage 101 there are no bills or notes upon the collecting cylinders 22 and the sweep blade 98 passes idly through the diametral slots through said cylinders. On the return stroke the cylinders are in rotation, but as the sweep blade travels along a path below the collecting cylinders (Figs. 1 and 5) their motion of rotation does not conflict with the movement of the said sweep blade. Toward the middle of the outward stroke or movement of the carriage, during a period of rotation of the cam shaft from an angle from 150° to an angle of 190° the note release mechanism is set by the passage of the envelope which, as shown in section *g* of the diagram (Fig. 58), commenced its movement with the outward stroke of the carriage 101. When the rotation of the cam shaft 216 reaches an angle of 230° the movement of the envelope is discontinued temporarily, being held during such period of discontinuance near the rear end of the machine between the feed rollers 240 and 241. It is permitted to remain in this position by reason of the presence of the intermittent gear 236 (Figs. 5 and 49) until the cam shaft 216 begins another revolution. During the backward stroke of the sweep carriage 101, that is, during the period that the cam shaft 216 completes its revolution from 180° to 360° the collecting cylinders 22 make six revolutions, five of which may be used for withdrawing or extracting bills or notes from the holder 7, and the sixth for positioning the said collecting cylinders with the diametral slots therein in alinement with the space between the guides 72 and 73. In this position of the collecting cylinders the grippers occupy positions nearly diametrically opposite the point of tangent contact of the guide strips 88 to the collecting cylinders 22 (Figs. 5 and 10) where the open grippers close upon the approaching note. During the half revolution of the collecting cylinders 22 to the positions last mentioned the holders 7 (Figs. 1 and 5 to 9) will have received their full forward movement and during the next half revolution of the said cylinders the said holders are returned to their rearmost positions. During the forward stroke of a bill or note holder the lowermost note of the bundle or package of bills or notes therein, which rests at its rear end upon the bottom of the holder and at its forward end upon the associated vacuum or suction roller 12 (Figs. 5, 10 to 12, and 14), is held strongly over the orifice or slot 79 by suction (in case there is a vacuum or partial vacuum in the roller) and the said bill or note is disengaged from the supporting toe of the depending arm 81 (Figs. 5 and 10) and the forward end of the said bill is bent downward, following the suction roller 12 as it rotates under the action of the rack 10, and is carried into the guide space between the separating blade 80 and the guide strips 85 and 86 and is conducted to and in between the feed rollers 26 and 28. These rollers carry the bill or note to the gripping points upon the collecting cylinders with a linear speed the same as that at which the periphery of the associated collecting cylinder 22 is moved. The bills or notes of the holder above the one withdrawn remain supported by the toe or projection at the lower end of the depending arm 81, previously referred to, and move forward undisturbed over the smooth surface of the separating blade 80. As the collecting cylinders continue their rotation the bill or note withdrawn is held fast by the outer grippers 37 and 40 (Figs. 16 to 18)

against the periphery of the cylinder above the inner grippers 38 and 39 which have remained closed. In the next revolution the operation is repeated with the variation that the next note or bill drawn is received by the inner grippers and so on, the two pairs of grippers operating alternately in each rotation of the collecting cylinders as they pass the point of reception of the bill or note. Near the end of the backward movement of the carriage 101 the lug 136 thereon contacts with the tappet 134 (Figs. 4ª, 5 and 25) on the cam bar 135 and effects backward movement of the latter. As a result of such movement the gripper release lever 142 (Figs. 5 and 10) is moved downward into contact with the gripper tappets 35 and 36 to actuate the same and to thereby release the hold of the grippers on the bills or notes and thereby also leave the latter free to be removed and carried along by the sweep blade 98. The bills or notes are carried by the sweep blade 98 (Figs. 1 and 5) to the rear end of the passage between the guides 72 and 73, from which point they are removed by the flexible blade or plunger 309 and transferred to the pocket 202 (Figs. 1, 39, 44 and 46) of the filling box 206 which has assumed a horizontal position. In the meantime, the envelope has resumed its movement forward, but has again been held between the rollers 240ª and 246ª (Fig. 39) of the second and third group of feed rollers.

Associated with these rollers are electrical contacts, previously referred to (but not shown), which control the coin release mechanism. After having effected the release of the coins onto the coin release table 344 the envelope remains stationary during the last 90° of the second revolution of the cam shaft 216 and during also the first 90° of the third revolution thereof. During the third revolution of the cam shaft 216 the filling box is tipped up into vertical position. The coins previously released by the passage of the envelope during the second revolution of the cam shaft 216 and retained upon the table 344 are tripped by the action of the cam 351 and enter the envelope, the open end of which is now in registry with the coin delivery spout. Immediately following this operation the vertical plunger 284 (Figs. 39 and 41) forces the envelope downward into the path of the plunger 273 (Figs. 39 and 44) which forces it along the delivery guide plate 279 during the second half of the third revolution. This constitutes the end of a cycle of operation. These cycles are continued over and over during the operation of the machine.

It should be noted that a cycle of operation, that is the movement of bills or notes, coins, and an envelope to the delivery point, occurs in four revolutions of the cam shaft 216, while the movement of the component moving parts is repeated during each revolution of the said shaft. However, a cycle of operation commences at every revolution of the cam shaft from which it follows that four filled envelopes are delivered during the four revolutions of the cam shaft which occur in the cycle.

Having thus described my invention, what I claim and desire to secure by Letters Patent is:

1. In an envelope-filling machine, the combination of a plurality of note-holding containers, pneumatic devices for effecting delivery of notes from said containers, a reciprocating member for conveying the said notes to a central point, a conveyor for delivering coins to said central point, a conveyor for delivering envelopes successively to said central point, and means acting automatically for placing the said notes and coins in said envelopes, said means comprising a rotatable support for the said envelopes.

2. In a machine for placing currency in envelopes, the combination of note-holding containers, means including pneumatic devices for selecting the required notes from the said containers, a conveyor for delivering said notes to a central point, a conveyor for supplying coins to said central point, and an adjustable support for the said envelopes located at the said central point for permitting the insertion of the currency collected at said central point into said envelopes.

3. In a machine for filling envelopes with currency, the combination of a plurality of note-holding containers, rotatable note-collecting cylinders located in adjacent relation to the respective note-holding containers, a conveyor for delivering the said notes to a central point, a conveyor for delivering coins to said central point, a conveyor for delivering envelopes to the said central point, and a support for holding the envelopes in different positions to permit insertion of the currency collected at said central point into the said envelopes.

4. In a machine for placing currency in envelopes, the combination of a plurality of note-holding containers, cylinders located in adjacent relation to each of said note-holding containers for collecting notes delivered from said note-holding containers, a conveyor for delivering said notes to a central point, a conveyor for delivering envelopes to said central point, valves controlled by the passage of said envelopes through the said machine to said central point for controlling the delivery of notes from said containers to the said collecting cylinders, and means acting automatically for effecting the placing of said notes in the said envelopes.

5. In a machine for placing currency in envelopes, the combination of a plurality of separate note-holding containers, note-collecting means located in operative relation to the respective note-holding container, a box containing a pocket into which said notes are adapted to be delivered, means for transferring notes from the said collecting means to said pocket, means for supplying envelopes to said box and for effecting insertion of the said notes thereinto, means for turning the said envelopes into position with their open ends extending upwardly, and means for delivering coins into the open ends of said envelopes.

6. In a machine for placing currency in envelopes, the combination of a plurality of note-holding containers, a plurality of note-collecting cylinders located in adjacent relation to the respective containers, means for withdrawing notes from said containers and depositing the same upon the said collecting cylinders, means for removing the said notes from the said collecting cylinders and combining them into a single package, means for folding and delivering said notes to a central point, a support at said central point for receiving and holding said notes, a conveyor for delivering envelopes to said central point and causing insertion of said note-holding support at that point into said envelopes, separate containers for coins, means for delivering selected coins from the containers therefor into said envelopes, means for thereafter removing the said envelopes from the said support, and a conveyor for discharging the said envelopes from the said machine.

7. In a machine for placing currency in envelopes, the combination of a plurality of note-holding containers, rotatable collecting cylinders located in adjacent operative relation to the said containers, the said cylinders having diametral slots extending therethrough, guides for a horizontal passageway located in a plane coincident with the axis of said cylinders, power-driven mechanism for effecting periodic rotation of the said cylinders, means to effect stoppage of said rotation at points with the diametral slots therethrough arranged in horizontal planes, pneumatic devices for effecting delivery of notes selectively from the said containers to the said cylinders, a reciprocating member operating in one direction through the said passageway and through the said diametral slots to remove the notes from the said cylinders and collect them in a single package and fold them along lines about the middle of their length, means for again folding and transferring said notes to a central point, a support at said central point for holding the said notes, a container for holding envelopes, a conveyor for delivering envelopes from said container successively to said support at said central point, said conveyor causing said envelopes to be thrust upon said support, means for supplying coins to said envelopes, and a plunger for removing said envelopes from said support.

8. In a machine for placing currency in envelopes, the combination of a plurality of separate note-holding containers, rotatable note-collecting cylinders located in operative relation to the said respective note-holding containers, power-driven mechanism for effecting periodic revolution of the said note-collecting cylinders, means including pneumatic devices for effecting the release of the selected notes from the said note-holding containers and depositing the same upon the said collecting cylinders, means for removing the said notes from the said cylinders, folding and transferring the same to a central point, a support for holding the said notes at said central point, a plurality of receptacles for holding coins, means for releasing selected coins from the said coin-holding receptacles, a conveyor for delivering envelopes to the said central point, contacts controlled by the passage of the envelopes through the said machine for effecting and controlling the means for releasing the notes and the coins, and means for effecting the placing of both the notes and the coins within the said envelopes.

9. In a machine for placing currency in envelopes, the combination of a plurality of separate note-holding containers, note collecting cylinders located in operative relation to the respective note-holding containers, pneumatic means for removing selected notes from the said note-holding containers and for effecting their delivery to the said collecting cylinders, power-driven mechanism for effecting periodic rotation of the said cylinders, a reciprocating member for removing the notes from the said cylinders, uniting them in a single package, and folding them about their middle points, means for again folding and transferring the said notes to a central point, a holder for receiving the notes at said central point, a plurality of separate receptacles for holding coins, a conveyor for delivering envelopes to said central point, said conveyor causing the said envelopes to be thrust upon the said holder, means for thereafter rotating the said holder into position with the open ends of the said envelopes extending upwardly, means for releasing selected coins and depositing the same in the said envelopes, means controlled by the passage of the said envelopes through the said machine to the said central point for controlling and effecting actuation of the note and coin-releasing mechanism, a plunger for removing the envelopes from the said holder after the said envelopes have been filled, and a conveyor for discharging the said envelopes from the machine.

10. In a machine of the character described, the combination of a plurality of separate note-holding containers, a plurality of separate receptacles for holding coins, a container for holding a supply of envelopes open at one end, conveyors for assembling the notes, coins and envelopes at a common point, and means acting automatically for effecting the placing of the said notes and coins within the said envelopes.

11. In a machine of the character described, the combination of a plurality of separate containers for holding notes, a plurality of separate containers for holding coins, an envelope-holding container, means including pneumatic devices for selecting the required notes from the note-holding containers, means for selecting the required coins from the coin-holding containers, conveyors for assembling the notes and coins thus selected and envelopes at a central point, and means acting automatically for effecting the placing of the said notes and coins in the said envelopes.

12. A machine for automatically filling envelopes with currency, comprising a plurality of note-holding containers, a plurality of coin-holding receptacles, a container for holding envelopes to be filled, a conveyor for delivering envelopes to a central point, electromagnets for controlling the delivery of notes and coins from their respective containers, electric circuits including said electro-magnets, contacts located in the said circuits adapted to be operated by the passage of the said envelopes to the said central point for controlling the energizing of the said electro-magnets whereby the required notes and coins are delivered from their respective containers, and conveyors for delivering the said notes and coins to the envelopes upon arrival of the latter at the said central point.

13. A machine for automatically filling envelopes with currency, comprising a plurality of note-holding containers, pneumatic devices for delivering notes from said containers, valves for controlling the pressure in said devices, electro-magnets for operating said valves, a plurality of coin receptacles, plates for controlling the discharge of coins from said receptacles, electro-magnets for operating said plates, an envelope-container, a conveyor for delivering envelopes to a central point, electric circuits including said electro-magnets, and contacts in said circuits adapted to be operated by the passage of said envelopes to the said central point for controlling the energizing of the said electro-magnets whereby the required notes and coins are delivered from their respective containers, and conveyors for delivering the said notes and coins to the said envelopes upon arrival thereof at the said central point.

14. A machine for automatically filling envelopes with currency, comprising a plurality of note-holding containers, a plurality of coin receptacles, a container for envelopes to be filled, a conveyor for delivering envelopes to a central point, electro-magnets for controlling the delivery of notes and coins from their respective containers, electric circuits including said electro-magnets, contacts located in said circuits and adapted to be operated by the passage of the said envelopes to the said central point and for controlling the energizing of the said electro-magnets whereby the required notes and coins are delivered from their respective containers, conveyors for delivering the said notes and coins to the said central point, and a movable support adapted to hold the said envelopes in different positions to permit the insertion of the said notes and coins into the said envelopes.

In testimony that I claim the foregoing as my invention I have hereunto signed my name this 10th day of April, A. D. 1926.

HAROLD B. COLLINS.